(12) United States Patent
Braunstein et al.

(10) Patent No.: US 7,126,629 B1
(45) Date of Patent: Oct. 24, 2006

(54) RECYCLABLE, DIGITAL ONE TIME USE CAMERA

(75) Inventors: Ariel Braunstein, San Francisco, CA (US); Jonathan Kaplan, San Francisco, CA (US)

(73) Assignee: Pure Digital Technologies, Icn., San Francisco, CA (US)

(*) Notice: Subject to any disclaimer, the term of this patent is extended or adjusted under 35 U.S.C. 154(b) by 537 days.

(21) Appl. No.: 09/949,421

(22) Filed: Sep. 7, 2001

(51) Int. Cl.
*H04N 5/225* (2006.01)
*H04N 5/76* (2006.01)
*G03B 17/02* (2006.01)

(52) U.S. Cl. .............. 348/207.1; 348/207.2; 348/231.99; 348/374; 348/375; 348/376; 396/6

(58) Field of Classification Search .......... 348/207.99, 348/375, 372, 373, 273–276, 231; 396/6
See application file for complete search history.

(56) References Cited

U.S. PATENT DOCUMENTS

| | | | |
|---|---|---|---|
| 4,442,462 A | 4/1984 | Kimura | |
| 4,626,106 A | 12/1986 | Hooper | |
| 4,641,182 A | 2/1987 | Gur | |
| 4,651,233 A | 3/1987 | Morisawa et al. | |
| 4,896,178 A | 1/1990 | Ohmura et al. | |
| 4,954,858 A | 9/1990 | Ohmura et al. | |
| 5,086,311 A | 2/1992 | Naka et al. | |
| 5,170,199 A | 12/1992 | Nakai et al. | |
| 5,235,364 A | 8/1993 | Ohmura et al. | |
| 5,278,701 A | 1/1994 | Kawarai et al. | |
| 5,315,332 A | 5/1994 | Hirasaki et al. | |
| 5,337,099 A | 8/1994 | Tasaka et al. | |
| 5,353,076 A | 10/1994 | Goddard | |
| 5,361,111 A | 11/1994 | Yamashina et al. | |
| 5,534,962 A * | 7/1996 | Zander | 396/6 |
| 5,610,730 A | 3/1997 | Osipchuk | |
| 5,655,156 A * | 8/1997 | Sieminski et al. | 396/6 |
| 5,826,112 A * | 10/1998 | Matsushita | 396/6 |
| 5,878,283 A | 3/1999 | House et al. | |
| 6,006,036 A | 12/1999 | Douglas | |
| 6,021,277 A | 2/2000 | Sowinski et al. | |
| 6,078,756 A | 6/2000 | Squilla et al. | |
| 6,231,148 B1 * | 5/2001 | Silverbrook | 396/6 |
| 6,356,357 B1 * | 3/2002 | Anderson et al. | 358/1.16 |
| 6,433,818 B1 * | 8/2002 | Steinberg et al. | 348/161 |
| 6,567,119 B1 * | 5/2003 | Parulski et al. | 348/207.1 |
| 6,950,129 B1 * | 9/2005 | Minne et al. | 348/231.99 |
| 2001/0030773 A1 * | 10/2001 | Matsuura et al. | 358/471 |
| 2001/0040625 A1 * | 11/2001 | Okada et al. | 348/207 |
| 2002/0191066 A1 * | 12/2002 | Bouchard et al. | 347/172 |

FOREIGN PATENT DOCUMENTS

| | | | |
|---|---|---|---|
| JP | 2000-228740 | * | 8/2000 |
| JP | 2000-253283 | * | 9/2000 |
| WO | PCT WO 98/26586 | | 6/1998 |

OTHER PUBLICATIONS

Reed, William, G.; One Time Use Digital Camera; WO 01/15440 A1; Mar. 1, 2001; World Intellectual Property Organization.*

(Continued)

*Primary Examiner*—David Ometz
*Assistant Examiner*—Nhan T. Tran
(74) *Attorney, Agent, or Firm*—Blakely, Sokoloff, Taylor & Zafman LLP

(57) ABSTRACT

A digital camera having a limiting-use component to limit use of the digital camera to a single use-cycle.

32 Claims, 18 Drawing Sheets

OTHER PUBLICATIONS

The Official Kodak site section for "Kodak Max One-Time-UseCameras": 2 pages, http://www.kodak.com/global/en/consumer/film/otuc.shtml.

The official FUJIFILM site section for one time use cameras: 1 page, http://www.fujifilm.com/tcm.html?x-tempest-op-generic&CurrentTopCategory=229&CategoryId=229&pagetype=UserTypeCategoryHome&GoToFocus=1&ContentType=Product&UserTypeId=2.

Kodak Environment Services—Recycling of One Time Use Cameras: 4 pages, Nov. 15, 2001, http://www.kodak.com/US/en/corp/environment/kes/recycling/otuc/infoReload.shtml.

Agfa single use cameras: 3pages, http://www.agfaphoto.com/products/ssu.html.

Konica single use cameras: by C.Kellog, 2 pages, Apr. 3, 2001, http://www.konica.com/products/35mm/filmin/filmin.htm.

iVillage Good Housekeeping article about selecting a one-time-use camera: 2 pages, http://goodhousekeeping.women.com/gh/buysmart/guides/60dcam11.htm.

Photo-seminar.com—Point and Shoot Cameras: by Brian Ratty, 2 pages, Copyright 1999, http://www.photo-seminars.com/Camerabuying.buyingpointshoot.htm.

Photography Basics—Knowing your camera: by Sherry Anderson, 2 pages, Copyright 2001, http://www.photographybasics.com/article1002.html.

CNN.com./SCI-TECH by Kuriko Miyake, 3 pages, Oct. 11, 2001, digital cameras go disposable http://www.cnn.com/2001/TECH/ptech/10/11/disposable.digital.cameras.idg/index.html.

Sanyo News Release in Japanese, English translation attached, 11 pages, Oct. 9, 2001, http://www.sanyo.co.jp/koho/hypertext4/0110news-j/1009-1.html.

Digital Photography Review, "Single-Use Digital- a good thing?" http://www.dpreview.com/news/0307/03073101dakotadigital.asp, Thursday, Jul. 31, 2003, pp. 2 total.

Wilson Rothman, "CVS Digital One-Time-User camera", Gadget of the Week, Time Magazine, Aug. 25, 2004, pp. 1 total.

Jefferson Graham, "A disposable digital camera enters the market at $19.99", USA Today, http://usatoday.printthis.clickability.com/pt/cpt?action=cpt&title=USATODAY.com+-+A..., Aug. 18, 2004, pp. 2 total.

Grace Aquino, "Digital Cameras Go Disposable, Ritz Camera offers an affordable digital alternative", PC World, http://www.pcworld.com/news/article/0,aid,111841,00.asp, Aug. 1, 2003, pp. 2 total.

* cited by examiner

1600

RECYCLABLE, DIGITAL ONE TIME USE CAMERA

FIELD OF THE INVENTION

This invention generally relates to a digital camera and devices associated with one time use digital camera.

BACKGROUND OF THE INVENTION

In a film-based one-time use camera (OTUC) the lens projects the image on a light sensitive film or directly on paper, such as Polaroid's OTUC, and the image remains analog. A film-based OTUC cannot manipulate the captured image. In order to receive a print from a film-based OTUC some physical unit/material has to come out of the camera (light sensitive film or paper) and in many cases break the camera shell in the process. The film-based OTUC relies on a mechanical apparatus (manually powered by the user's hand) to prepare the camera for the next shot (picture taking). The film-based OTUC are typically easy to use, low cost, and recyclable. However, The film-based OTUC differ from digital photography in several ways such as lack high quality images, all-digital processing rather than chemical processing, and the digital format of the information which allows immediate previewing of photos, sharing photos through e-mail, etc.

The design of the multi-use digital cameras allows the consumer to take as many pictures as desired. The camera may be limited in capacity but the consumer can either extend the capacity (add more memory if the camera supports removable memory or external storage device like a floppy drive or mini-CD) or upload the pictures from the camera to a PC or any other type of external storage device (e.g. portable zip drive) and erase them from the camera. Multi-use digital cameras are designed to provide the consumer with digital photography experience. They allow the consumers to preview the taken pictures, browse through stored pictures, add information on the picture (i.e. date etc.), set resolution and image quality for better use of capacity and other digital capabilities that define the digital photography experience. The multi-use digital camera posses a large amount of internal processing power. In a multi-use digital camera the Central Processing Unit (ASIC and/or micro controller) should be able to provide the consumer with the set of features as part of the digital photography experience. The communication port in a multi-use camera (serial, parallel, USB or any other type of communication) is designed for maximum compatibility with other devices or computers. The easier it is to connect to another device the better it is.

SUMMARY OF THE INVENTION

A digital camera having a limiting-use component to limit use of the digital camera to a single use-cycle.

BRIEF DESCRIPTION OF THE DRAWINGS

The drawings refer to the invention in which.

Figure 1:
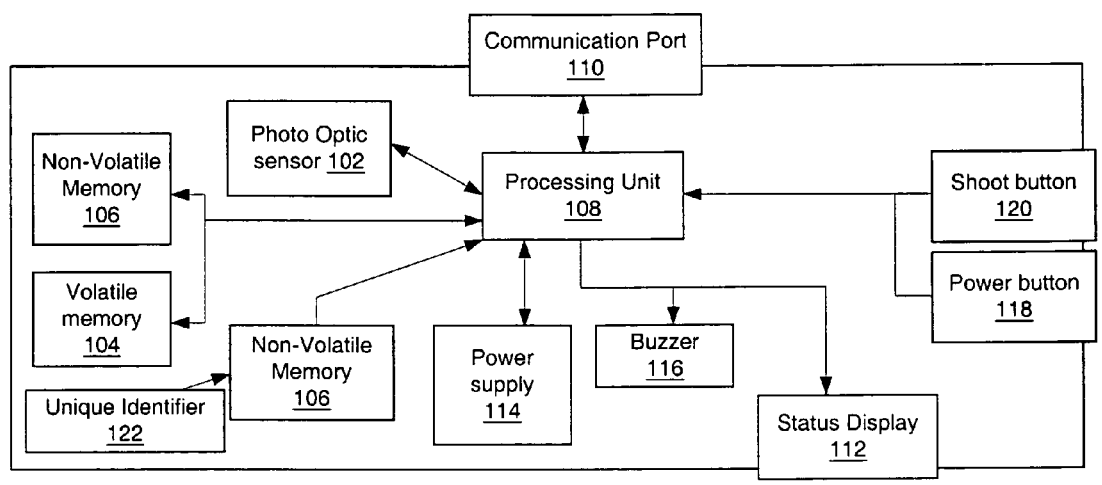
FIG. 1 illustrates an embodiment of a block diagram of a Digital One-Time-Use-Camera (Digital OTUC)

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION OF THE INVENTION

In the following description, numerous specific details are set forth, such as examples of specific data signals, named components, connections, types of limiting-use components, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. The term coupled is defined as meaning connected either directly or indirectly.

In general, a method, apparatus, and system use a digital camera having a limiting-use component to limit use of a digital one-time use camera (digital OTUC) to a single use-cycle. A single use-cycle may be a designed consumer use of the product such as twenty pictures, ten hours of operation, or other similar use of the digital OTUC. The limiting-use component may vary from limiting the power supply in some manner, limiting user access to the image data of pictures taken by the digital OTUC, and many other similar techniques.

Figure 2:
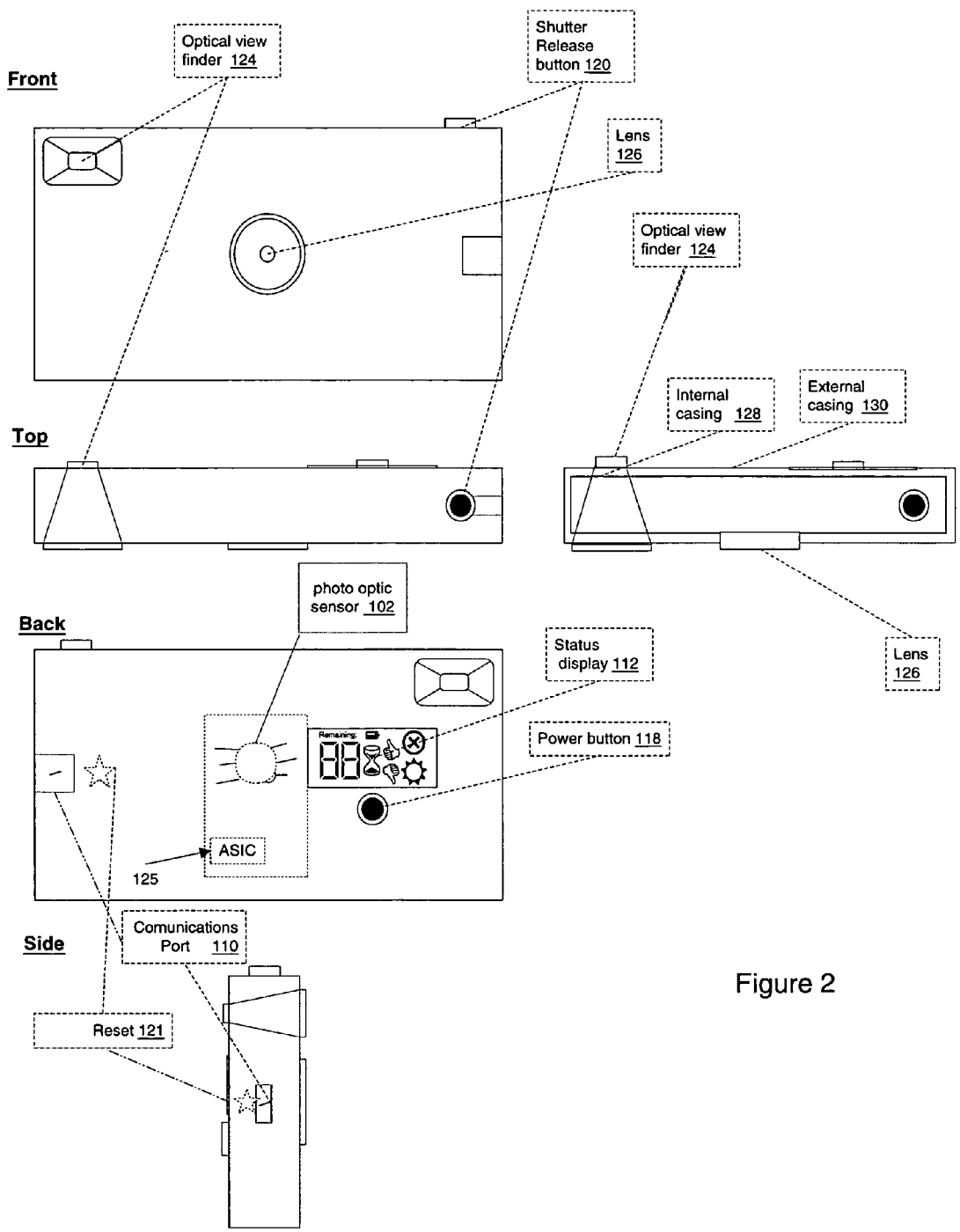
FIG. 2 illustrates an embodiment of a physical block diagram of a digital OTUC.

FIG. 1 illustrates an embodiment of a block diagram of a Digital One-Time-Use-Camera (Digital OTUC). FIG. 2 illustrates an embodiment of a physical block diagram of a digital OTUC. Referring to FIGS. 1 and 2, in an embodiment, the digital OTUC 100 may have a photo optic sensor 102, such as 1280×1024 Pixel Complementary Metal Oxide Semiconductor or a Charge Coupled Device sensor, volatile memory 104, such as eight Megabytes of Synchronous Dynamic Random Access Memory, Non volatile memory 106, such as four Megabytes of internal flash memory and/or five hundred and twelve kilobytes of Read Only Memory, a processing unit 108, such as a micro-controller, one or more communication ports 110, such as a proprietary Universal Serial Bus-based interface, an optical view finder 124, a focus lens 126, such as a fixed focus lens, a status display 112, such as a multi-segment status Liquid Crystal Display, a power supply 114, such as batteries, an audio indicator 116, such as a buzzer 116, a power button 118 such as an On/Off button with automatic power-off on idle, a shutter release ("Shoot") button 120, a reset mechanism 121, an internal casing 128, and an external casing 130.

Referring to FIG. 2, in an embodiment, photo optic sensor 102 converts the optical image into a data array. The focus lens 126 projects the actual image onto the photo optic sensor 102 to convert the analog image into an array of digital information. The photo optic sensor 102 quantifies the variable shades of light focused on the photo optic sensor 102 by the focus lens 126 into data arrays representing a discrete number of colors. The photo optic sensor 102 may also contain an Application Specific Integrated Circuit (ASIC) 125 to provide several optional features such as automatic exposure adjustment, automatic white balance, and automatic gamma compensation. The automatic exposure adjustment changes the photo optic sensor's 102 light sensitivity depending upon the lighting conditions. The automatic white balance balances the hue of the color spectrum in the data array. In an embodiment, the automatic white balance corrects the image colors by finding the "white point" of the image, correcting it to be white and skewing the rest of the image in the same amount/direction. The automatic gamma correction adjusts the brightness of the image contained in the data array. In an embodiment, the automatic gamma correction modifies the digital photo to compensate for the nonlinear response of the digital components by raising the input luminance levels to the power of n depending on the gamma of the device. In an embodiment, the digital OTUC may use a 1.3 MPixel optical sensor.

Referring to FIG. 1, in an embodiment, the processing unit 108 executes the firmware instructions stored in the non-volatile memory 106 such as Read Only Memory copies the instructions to the volatile memory 104 for execution. The processing unit 108 controls the operation of the digital OTUC 100. The processing unit 108 may use portions of the volatile memory 104 to covert the data array information into an image format, such as a Joint Photographic Experts Group format. The raw image data is then stored in the non-volatile memory 106. The power supply 114 activates components within the digital OTUC 100 but once the image is captured and stored in a non-volatile memory 106, then the power supply 114 is no longer required to maintain the captured image data.

In an embodiment, the communication port 110 facilitates communications between the components internal to the digital OTUC 100 and devices external to the digital OTUC 100. Also, the communication port 110 may receive reset signal to allow the digital OTUC 100 to be used for another cycle. A propriety mechanism, such as a key, may communicate a physical or electronic signal through the communication port 110 to reset the digital OTUC 100 for another cycle. The optical viewfinder 124 allows a user to see the image of the photo to be taken and to target that area. The status display 112 visually communicates information, such as number of picture left to be taken, low lighting conditions, and other similar information.

Referring to FIG. 2, the internal casing 128 may contain the electronic components associated with the digital OTUC 100. The external casing 130 may be hard shell designed to protect the digital OTUC 100 and to prevent repeated use of the digital OTUC 100 by the user. For example, the external casing 130 may be keyed in conjunction with the focus lens 126 such that the internal casing 128 can only be removed in the factory or else render the entire digital OTUC 100 useless. This would prevent the user from replacing an expired power supply 114, extending the capacity of the memory, volatile memory 104 or non-volatile memory 106, storing the image data, and or other mechanisms in the digital OTUC 100 design so that the digital OTUC 100 is only used by a particular consumer for a single cycle before being returned to factory to be refurbished for another use. In an embodiment, a protective layer, such as Styrofoam may exist between parts of the internal casing 128 and external casing 130. In contrast to a film based one-time use camera, the digital OTUC 100 may transfer, via the communication port 110, the entire image information from the digital OTUC 100 to a processing unit 108 without the need to harm the digital OTUC 100 protecting shell. In an embodiment, the digital OTUC 100 has a physical reset mechanism 121 that is inaccessible through the external casing 130. In an embodiment, the reset mechanism 121 is accessible through the communication port 110.

The single-use per cycle restriction may be implemented through use of various design mechanisms. A few examples of design mechanism will be described to illustrate limiting the digital OTUC 100 to a single cycle. However, the invention should not be limited to the examples shown to illustrate this concept. For example, in an embodiment, the digital OTUC 100 may allow the consumer to use it freely until the digital OTUC 100 runs out of power. The power supply 114 may be batteries good for 10 hours of use. In an embodiment, the power supply 114 may connect to a circuit to continuously drain the power supply 114 once the power button 118 is pressed. In an embodiment, the digital OTUC 100 may allow the consumer to take pictures until the memory, the volatile memory 104 or non-volatile memory 106, is full. The amount of bytes an image occupies (file size) a picture in digital photography varies if it is compressed. The digital OTUC 100 may allow the consumer to take pictures until available memory space is written in by image data. In this case, the consumer may not erase pictures previously taken from the digital OTUC 100. Further, the internal casing 128 and external casing 130 may be design to not provide access to remove the actual memory card containing the image data.

In an embodiment, the digital OTUC 100 may allow the consumer to take a preset number of pictures. The digital OTUC 100 is design to be limited in the number of pictures the digital OTUC 100 can take, a predefined limit, regardless of available memory. The consumer cannot extend its capacity or upload the pictures to an external storage for the purpose of freeing up space for further use. In an embodiment, each digital OTUC 100 contains a unique identifier 122, such as a digital code embedded in the non-volatile memory 106 of the digital OTUC 100. The digital OTUC 100 imprints this unique identifier 122 on all of the images taken by the digital OTUC 100. The unique identifier 122 then may be used to track use of this particular digital OTUC 100. Criteria may be used to limit the use of the digital OTUC 100, such as the number of images associated with this unique identifier 122 or the number of recycle rotations associated with this unique identifier 122, etc. In an embodiment, an internal clock circuit may be connected to the power supply 114 and triggered by the power button 118. The digital OTUC 100 may include an internal clock and may offer use for X days from first shot or any other time limit definition. In an embodiment, the battery life may be thought as a set amount of use rather than an actual period of time.

The image processing process associated with the digital OTUC 100 may be implemented in many ways. A few examples of design mechanism will be described to illustrate the image processing process associated with the digital OTUC 100. However, the invention should not be limited to the examples shown to illustrate this concept. In an embodiment, little to no image processing occurs in the digital OTUC 100. The digital OTUC 100 stores raw image data from the photo optic sensor 102 into non-volatile memory 106. The raw image data is then sent through the communication port 110 to a device exterior to the digital OTUC 100 to process the raw image data.

In an embodiment, image formatting occurs in the digital OTUC 100. The processing unit 108 executes instructions stored in ROM or copied to volatile memory 104 to format the raw image data to create an actual image file that may be stored in non-volatile memory 106. The image file is then sent through the communication port 110 to a device exterior to the digital OTUC 100 to automatically process the image file as well as allow the consumer to manipulate the size, colors, etc., of the photo. In an embodiment, image processing occurs in the digital OTUC 100. The digital OTUC 100 formats the raw image data. The processing unit 108 executes instructions stored in non-volatile memory 106 or copied to volatile memory 104 to automatically improve the quality of the image in the image file, using image-processing techniques.

The connectivity and compatibility associated with the digital OTUC 100 may be implemented in many ways. A few examples of design mechanism will be described to illustrate the connectivity and compatibility associated with the digital OTUC 100. However, the invention should not be limited to the examples shown to illustrate this concept. In an embodiment, the digital OTUC 100 may use standard connections for the communication port 110 in order to off load the data files stored in the volatile memory 104 or non-volatile memory 106. The digital OTUC 100 contains one or more communication ports 110. Each communication port 110 may connect to devices external to the digital OTUC 100 through various standard connectors such as a serial port, a parallel port, a universal serial bus port, a RCA television connect jack or other similar standard connection. The digital OTUC 100 can freely connect to any PC, laptop or other standard devices (disk drives, printers, etc.) where pictures can be off-loaded and printed.

In an embodiment, the digital OTUC 100 can only be connected to special devices, such as an external processing unit, that are distributed in specific retail locations where the pictures can be off-loaded to an online site or printed. The connector to the communication port 110 is proprietary and the special devices have the mating connector to the proprietary communication port 110. In an embodiment, the special devices are located at an off-site facility and not at a retail facility. The digital OTUC 100 has to be placed in drop box or mailed. The digital OTUC 100 is transferred to the off-loading facility where the special device is located and the consumer gets the pictures online, mailed the image files embedded on a Compact Disc, or receives printed photos of the images.

In an embodiment, the proprietary connector is physically different in shape than current industry standard connectors. In an embodiment, the shape of the proprietary connector and the associated chip set conforms to a standard connector shape and chip-set. However, the proprietary connector and proprietary communications port are wired differently than the standard connections to make the port and connector proprietary. For example, if an industry standard connector has 8 pins and the pins electrically connect in a certain pre-defined order, then the proprietary connector and proprietary port change that order so that only these proprietary cables, connectors, and ports harmonize with each other and the refurbishing process.

The consumer's ability to preview taken pictures during the digital OTUC 100 use and prior to printing associated with the digital OTUC 100 may be implemented in many ways. A few examples of design mechanism will be described to illustrate the consumer's ability to preview taken pictures during the digital OTUC 100 use and prior to printing associated with the digital OTUC 100. However, the invention should not be limited to the examples shown to illustrate this concept. In an embodiment, the digital OTUC 100 gives the consumer the ability to preview taken pictures during the digital OTUC 100 use and prior to printing. The digital OTUC 100 the processing unit 108 executes a software program in the non-volatile memory 106 to display a JPEG formatted image on a Liquid Crystal Display (LCD). In an embodiment, the consumer can connect the digital OTUC 100 through the communication port 110 to a display device, such as a television, in order to preview the taken pictures while the digital OTUC 100 is still "in use" (not expired). In an embodiment, at any time the consumer can bring the digital OTUC 100 to a retail store where special equipment is available to view and print taken pictures while the digital OTUC 100 is in use (not expired). In an embodiment, once the single-use restriction expires, then the consumer can bring the digital OTUC 100 to a retail store where special equipment is available to view and print the taken pictures.

The consumer's ability to remove or not remove the memory containing the image data may be implemented in many ways. A few examples of design mechanism will be described to illustrate the consumer's ability to remove or not remove the memory, volatile memory 104 or non-volatile memory 106, containing the image data. However, the invention should not be limited to the examples shown to illustrate this concept. A digital OTUC 100 may include a removable memory where after the one-time-use the consumer may keep the memory with his/her intellectual property. The internal casing 128 and external casing 130 may have a removable cover designed into the structure of the casings 128, 130 to allow the removal of a memory card plugged in a card slot.

In an embodiment, a digital OTUC 100 may not allow the consumer to remove the memory, volatile memory 104 or non-volatile memory 106, containing the image data for safekeeping. The consumer may take the digital OTUC 100 to a store where he/she can off-load the taken pictures and potentially purchase a digital negative for safekeeping. The external casing 130 may be designed to allow no entry into the structure of the casing in order to remove the memory. Further, the memory may be hardwired into the electronic circuitry contained within the digital OTUC 100.

The digital OTUC 100 may or may not have a flash strobe. In an embodiment, a digital OTUC 100 may include a built-in-flash strobe for low light photography. In an embodiment, the flash strobe may be activated upon manually depressing and continuing to depress the power on button. In an embodiment, the digital OTUC 100 may rely on the sensitivity of the photo optic sensor 102 to produce high quality indoor photos. In an embodiment, some software manipulation of the image data for the low-light image quality enhancement may be done external to the digital OTUC 100, such as in an external processing unit 108

The status display 112 associated with the digital OTUC 100 may be implemented in many ways. In an embodiment, a digital OTUC 100 may include a multi-segment status LCD. This LCD may include multiple icons and numbers to indicate the current digital OTUC 100 status such as processing, number of pictures left to be taken, low light conditions, etc. In an embodiment, a digital OTUC 100 may include a light-emitting diode (LED) based status indication. The LED lights may be several different colors to indicate the digital OTUC 100 status such as processing, number of pictures left to be taken, low light conditions, a "battery low" indicator, etc. In an embodiment, the digital OTUC 100 may be equipped with mechanical indication of status such as a mechanical picture counter, etc.

In an embodiment, consumers view pictures directly from the digital OTUC on their TV set through the RCA jack. In this embodiment, the batteries are accessible to the consumer. In this embodiment, the limiting use-component may be the unique identifier imprinted into the images captured by the digital OTUC. After X number of the images taken by the Digital OTUC, then use can purchase a software reset to allow the digital OTUC to take additional pictures.

In an embodiment, the digital OTUC may contain two or more ASICs. The optical sensor may include an ASIC with some image processing capabilities. The digital OTUC may include an additional image processing ASIC for image compression and TV-out capabilities. In addition to these two ASICs there may be a micro-controller that command the digital OTUC logic and in the absence of the second ASIC may perform some image processing.

The consumer's ability to reset or not reset the same digital OTUC 100 for another use cycle may be implemented in many ways. In an embodiment, a digital OTUC 100 may be designed for a single use with some limiting factor to define the single use, but with the consumer has the ability to purchase a digital OTUC 100 reset token. In an embodiment, the digital OTUC reset token fits into a proprietary reset mechanism 121 designed into the external casing 130 and internal casing 128 to perform a physical single time reset. In an embodiment, a digital OTUC 100 may be designed for a single use with some limiting factor to define the single use, but with the ability to purchase a digital OTUC reset software. The reset software uses some standard connector such as a USB, parallel, serial, etc., to perform a single time reset at home using a home PC or a laptop. In an embodiment, a digital OTUC 100 may be designed for a single use with some limiting factor to define the single use, but with the ability to purchase a digital OTUC reset at the store. The consumer brings the digital OTUC 100 to the store and the clerk performs the reset for him/her using special equipment such as a digital OTUC reset token that mates to the reset mechanism 121 after the external casing has been removed and the reset token cannot be purchased elsewhere. In an embodiment, a digital OTUC 100 may be designed with no option for reset besides an off-site refurbishing process.

The recycling rotations and refurbishing of the digital OTUC 100 may be implemented in many ways. A few examples of design mechanism will be described to illustrate the recycling rotations and refurbishing of the digital OTUC 100. However, the invention should not be limited to the examples shown to illustrate this concept. In an embodiment, no recycling rotations and refurbishing occur. The consumer buys the digital OTUC 100 and uses the digital OTUC 100 for as long as the single-use restriction is not surpassed. Once the consumer is through with the digital OTUC 100, then the consumer may dispose of the digital OTUC 100 in the trash. In an embodiment, a recycling rotation consists of a complete life cycle of the digital OTUC. In an embodiment, during the refurbishing process the digital OTUC limiting-use component is reset and the digital OTUC has several quality assurance tests performed on the camera prior to shipped for consumer use again.

In an embodiment, some recycling rotations and refurbishing occur. The consumer buys the actual digital OTUC 100 once and then continues buying refills or resets for that same digital OTUC 100. The consumer buys the digital OTUC 100 and uses the digital OTUC 100 for as long as the single-use restriction is not surpassed. Once the consumer is through with the first use of the digital OTUC 100, then the consumer can buy refills or resets to make another use of the same initial digital OTUC 100. In an embodiment, the consumer buys the digital OTUC 100 and then returns the digital OTUC 100 for a factory or store refurbishing of the digital OTUC 100. The consumer buys the digital OTUC 100 and uses it for as long as the single-use restriction is not surpassed. Once the consumer is through with the digital OTUC 100, then the consumer brings the digital OTUC 100 back to the store where he gets prints and/or online uploads. The digital OTUC 100 may stay with the store or be sent to the factory for refurbishing. In an embodiment, the same digital OTUC camera may be sold to a consumer, go through a use cycle, be refurbished, and repeat this life cycle multiple times over the existence of the same digital OTUC. In an embodiment, the limiting-use component and the recycling are used to sell the same camera several times.

In an embodiment, the external casing may facilitate making components contained under or on the inner casing inaccessible. The external casing may serve additional purposes such as follows. The external casing may protect the digital OTUC from harm, increase durability, provide shock absorption, provide water resistance and other similar functions. The external casing may enable fast recycling and refurbishing by limiting the refurbishing to a reset, a quality assurance tests and replacing the outer shell.

Figure 3:
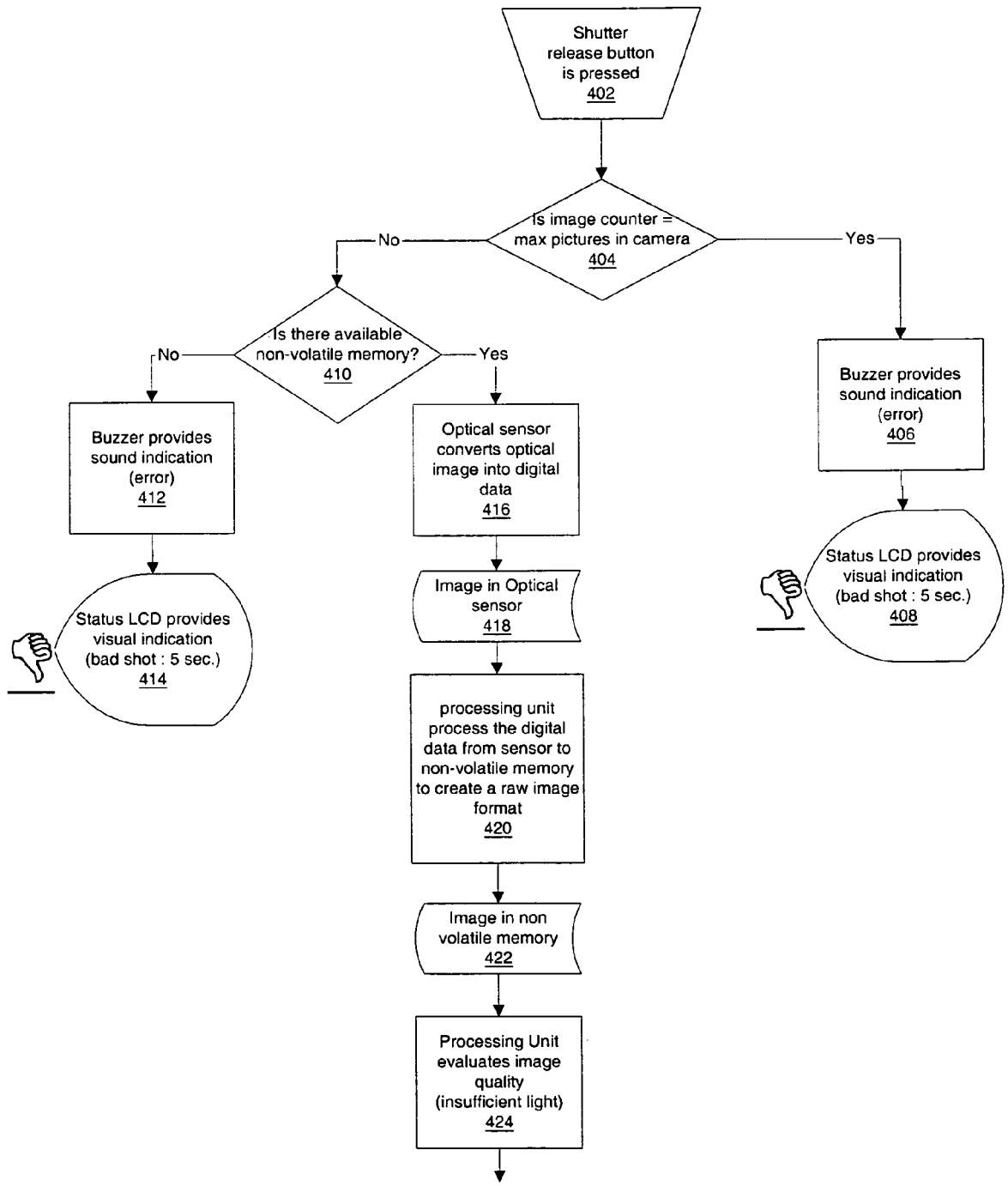
FIG. 3 and FIG. 4 illustrate a flow diagram through the operation of an embodiment of a digital OTUC.
Figure 4:
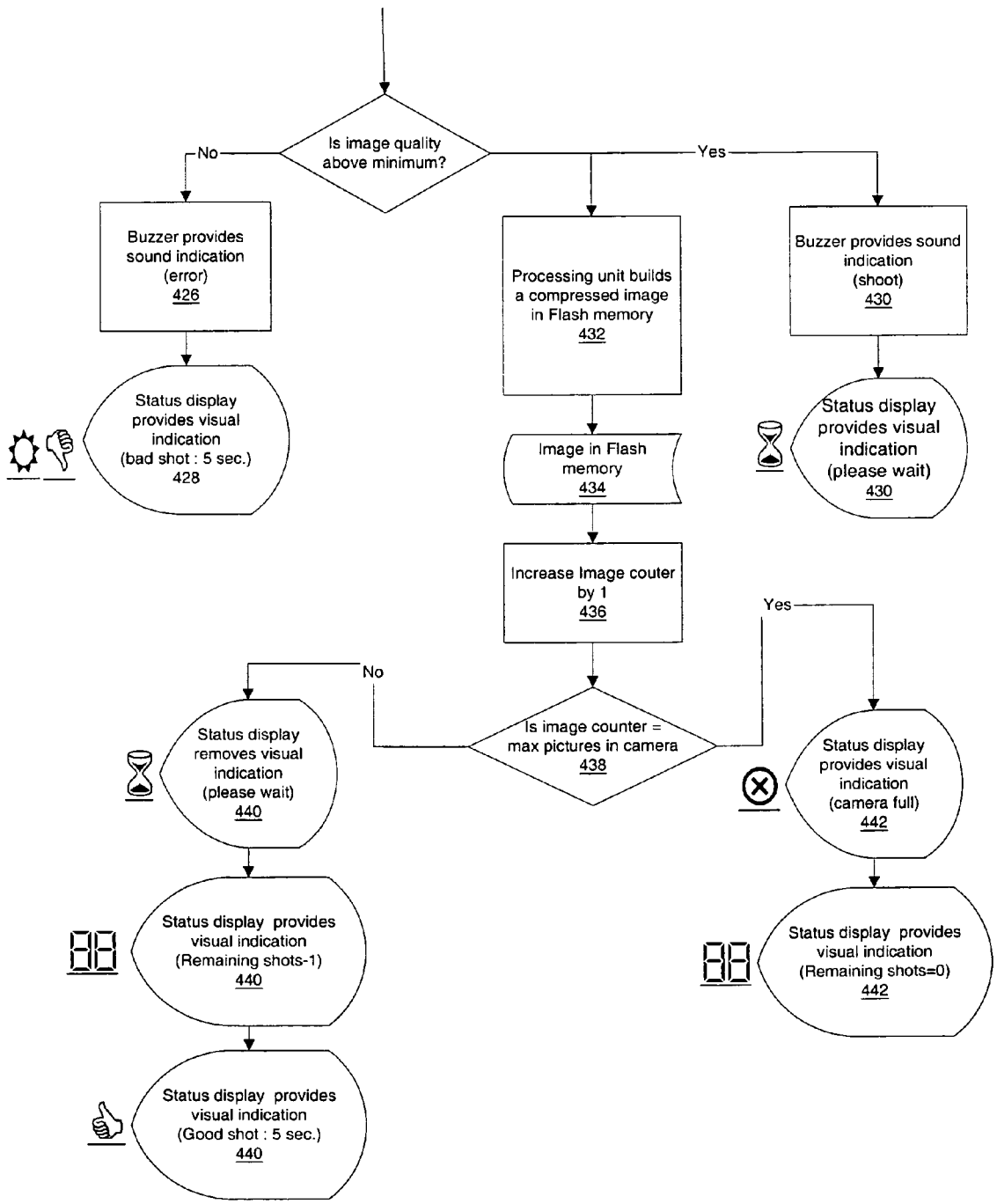

FIG. 3 and FIG. 4 illustrate a flow diagram through the operation of an embodiment of a digital OTUC. The consumer purchases a digital OTUC. The consumer may activate the digital OTUC by depressing the power on button. The consumer may line up the intended target of the picture through the viewfinder and say, "Smile."

In block 402, the consumer presses the shutter release button.

In block 404, the processing unit determines whether an image counter, such as a register, indicates that the maximum number of pictures allowed to be taken by the single use requirement has been taken. In an embodiment, the limiting component is the software limiting the maximum number of pictures that the digital OTUC camera may take. In an embodiment, references the limiting-use component to see if the single use requirement has been exceeded.

In block 406, if the processing unit determines that the single use limitation has been equaled or exceeded, then the processing unit directs a signal to the buzzer to provide sound indication of the error condition.

In block 408, if the processing unit determines that the single use limitation has been equaled or exceeded, then the processing unit directs a signal to the status display to provide a visual indication of the error condition.

In block 410, the processing unit determines whether enough capacity exists in the volatile memory or non-volatile memory to store image data representing another picture. In an embodiment, the processing unit determines whether an image counter, such as a register, indicates that the maximum number of pictures allowed to be taken by the single use requirement has been taken.

In block 412, if the processing unit determines that the single use limitation has been equaled or exceeded or not enough actual capacity exists, then the processing unit directs a signal to the buzzer to provide sound indication of the error condition.

In block 414, if the processing unit determines that the single use limitation has been equaled or exceeded or not enough actual capacity exists, then the processing unit directs a signal to the status display to provide a visual indication of the error condition.

In block 416, the photo optic sensor converts optical image into digital data.

In block 418, the digital data of the optical image is stowed in the optical sensor volatile memory.

In block 420, the processing unit processes the digital data from the photo optic sensor to non-volatile memory to create a raw image format. In an embodiment, some of the image processing occurs within the volatile memory.

In block 422, the processing unit stores the image data in volatile memory, such as (SDRAM).

In block 424, the processing unit executes firmware to determine whether the image quality is above factory set minimum.

In block 426, if the processing unit determines that the image quality is too poor, then the processing unit directs a signal to the buzzer to provide sound indication of the error condition.

In block 428, if the processing unit determines that the image quality is too poor, then the processing unit directs a signal to the status display to provide a visual indication of the error condition.

In block 430, if the processing unit determines that the image quality is above the factory set minimum, then the processing unit directs a signal to the buzzer to provide sound indication of the successful picture and directs a signal to the status display to provide a visual indication of the successful picture condition.

In block 432, the processing unit builds a compressed image of the picture in the either non-volatile memory or volatile memory.

In block 434, the processing unit stores the compressed image in non-volatile memory.

In block 436, the processing unit increases the image counter, such as a register that the processing unit references, by one.

In block 438, the processing unit determines whether the image counter indicates that the maximum number of pictures in the digital OTUC has been taken. The maximum number of pictures may be determined by a one-time use restriction imposed on the camera or a lack of memory space to store another digital image.

In block 440, if the processing unit determines that the maximum number of pictures in the digital OTUC has not been taken, then status display removes a visual indication such as please wait. The status display provides visual indication of the remaining pictures left to be taken. The status display provides visual indication, such as Good shot, that the picture has been successfully taken.

In block 442, if the processing unit determines that the maximum number of pictures in the digital OTUC has been taken, then status display visual indication that the camera is full.

Figure 5:
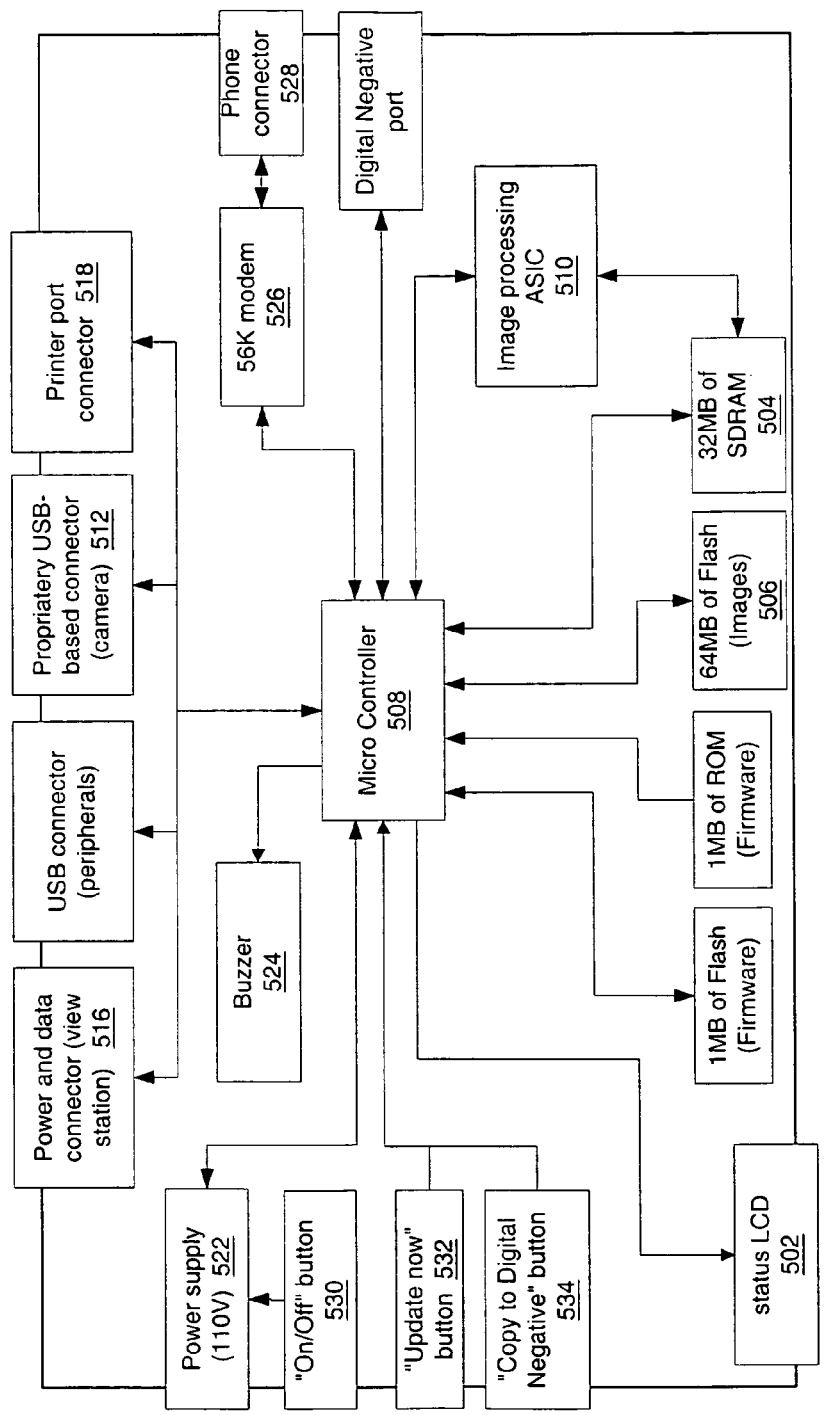
FIG. 5 illustrates a block diagram of an embodiment of an external processing unit.

FIG. 5 illustrates a block diagram of an embodiment of an external processing unit. In an embodiment, the external processing unit 500 may contain a status display 502, such as Multi-segment status LCD, volatile memory 504, such as 32 MB of Synchronous DRAM, non-volatile memory 506 such as 64 MB of internal flash memory, a processing unit 508 such as a Micro-controller for firmware execution, an image processing ASIC 510, a proprietary interface 512 for the digital OTUC, a standard port for peripherals and maintenance, a data and power port 516 for a view station connection, a printer port 518, a digital memory port for removable or portable memories such as a CompactFlash, SmartMedia or Memory Stick, a power supply 522, a buzzer 524, a modem 526, a phone connection 528, and several operation buttons such as a power button 530, an update now button 532, a copy to digital negative button 534, and other similar buttons.

The external processing unit 500 may be located as a retail-location device that enables the digital OTUC to get connected to other digital devices such as monitor, printers, email, etc. The external processing unit 500 may have several functions such as reading the data out of the digital OTUC, processing the image data and improving the quality of the image data, and connecting the images with other devices.

The external processing unit 500 may use a proprietary USB-based connection to read the pictures off the digital OTUC and store it in its internal non-volatile memory 506. Once the pictures are stored in its internal non-volatile memory 506 the external processing unit 500 processes the images and performs a series of procedures to ensure that the image quality is as high as possible. Once the processing stage is complete the image data is ready to be used by other devices such as a view station, a modem 526, a printer, a photo finishing Mini-lab, a computer or any other similar device.

The external processing unit 500 includes two docking bays: one for the digital OTUC and the other for removable digital storage media (called Digital Negative). The external processing unit 500 may be designed for use by the clerk in the retail location or by the consumer in a self service model.

Figure 6:
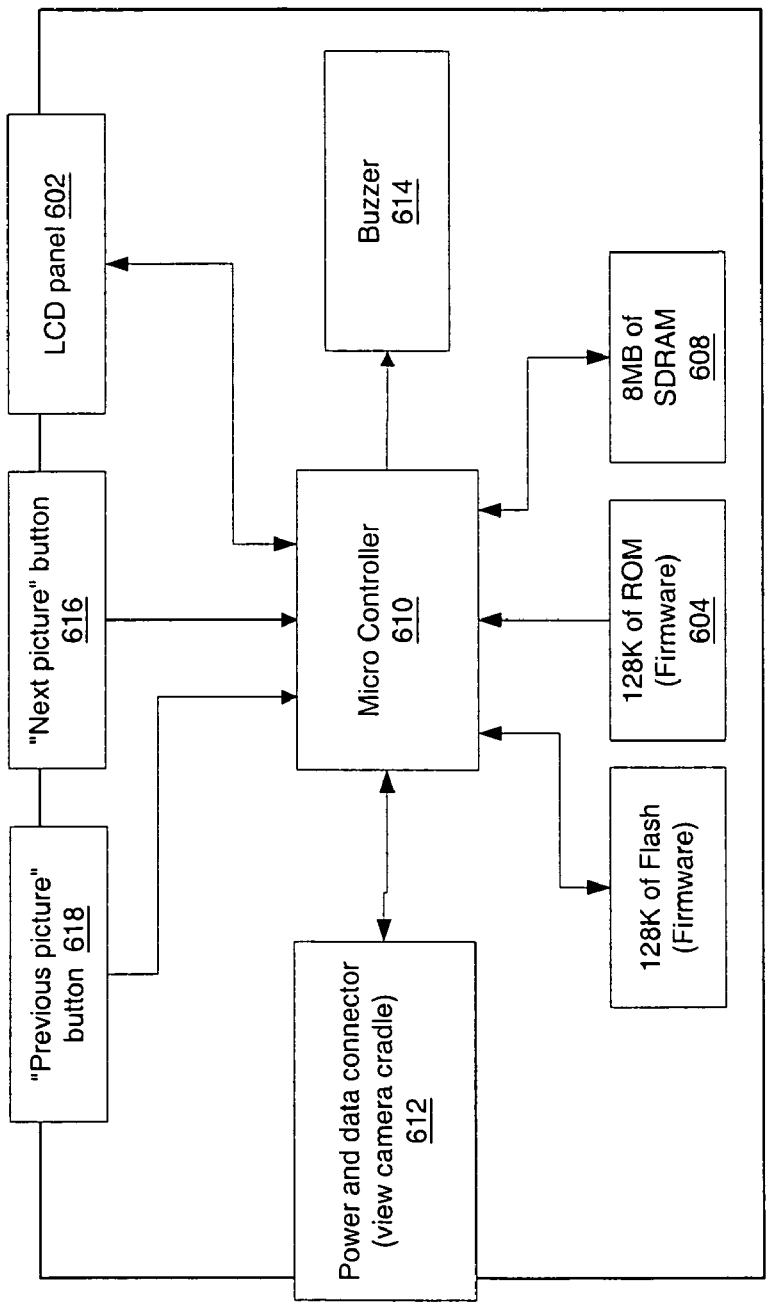
FIG. 6 illustrates a block diagram of an embodiment of a view station.

FIG. 6 illustrates a block diagram of an embodiment of a view station. In an embodiment, the view station 600 may contain Status display such as, a color LCD display 602, non-volatile memory 604 such as 128K of ROM for firmware, volatile memory 608 such as 8 MB of SDRAM, a micro-controller 610 for firmware execution, a data and power port 612 for camera cradle connection, a data and power cable for external processing unit connection (not shown), a buzzer 614, and several user operation buttons 616 such as a Next picture button, a Previous picture button 618, a print picture button (not shown), or other similar buttons.

The view station 600 may be used for picture viewing and printing selection. The view station 600 may be designed for use by the consumer and may be located over the counter. The view station 600 may be connected to the external processing unit with an appropriate type of cable. The view station 600 may include a color LCD display and a user interface for image browsing and print selection.

Figure 7:
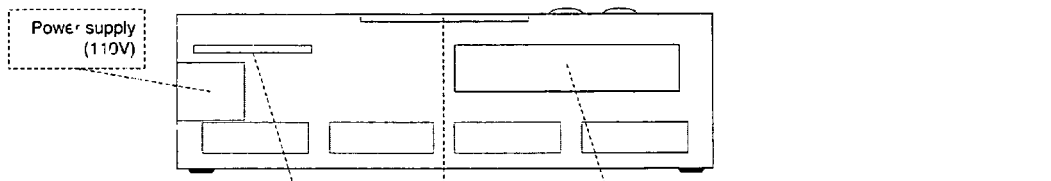
FIG. 7 illustrates a physical layout diagram of an embodiment of an external processing unit.
Figure 7:
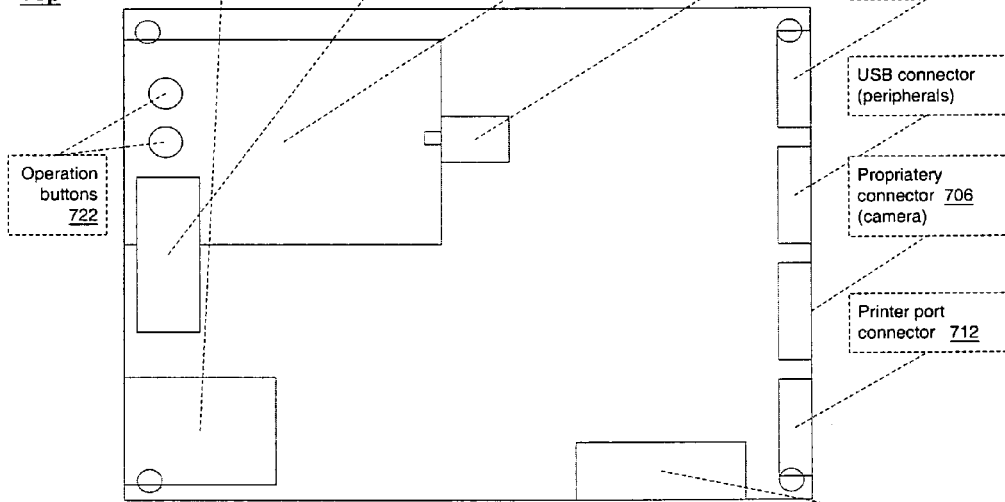
Figure 7:
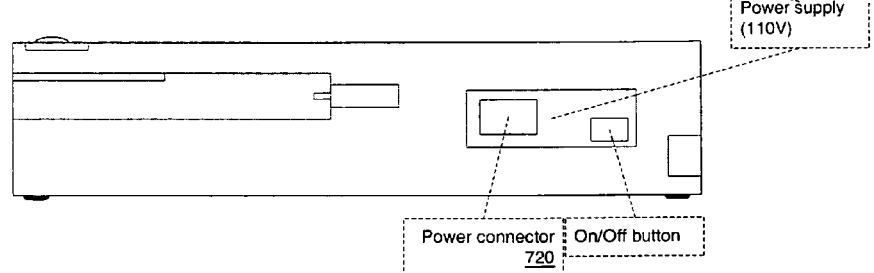
Figure 7:
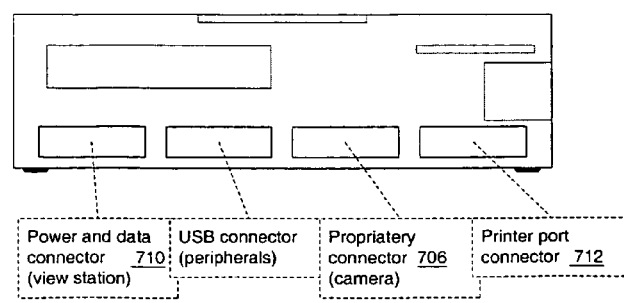

FIG. 7 illustrates a physical layout diagram of an embodiment of an external processing unit. In an embodiment, the external processing unit 700 may contain a status display 702, camera cradle 704, a proprietary connector 706 for the digital OTUC, a standard port for peripherals and maintenance such as a USB connector 708, a data and power port 710 for a view station connection, a printer port 712, a removable digital memory read/write port 714 for removable memories such as a CompactFlash, SmartMedia, Memory Stick, floppy disk, CD-ROM, or a DVD, a power supply connector 720 and several operation buttons 722 such as a power button, an update now button, a copy to digital negative button, and other similar buttons.

Figure 8:
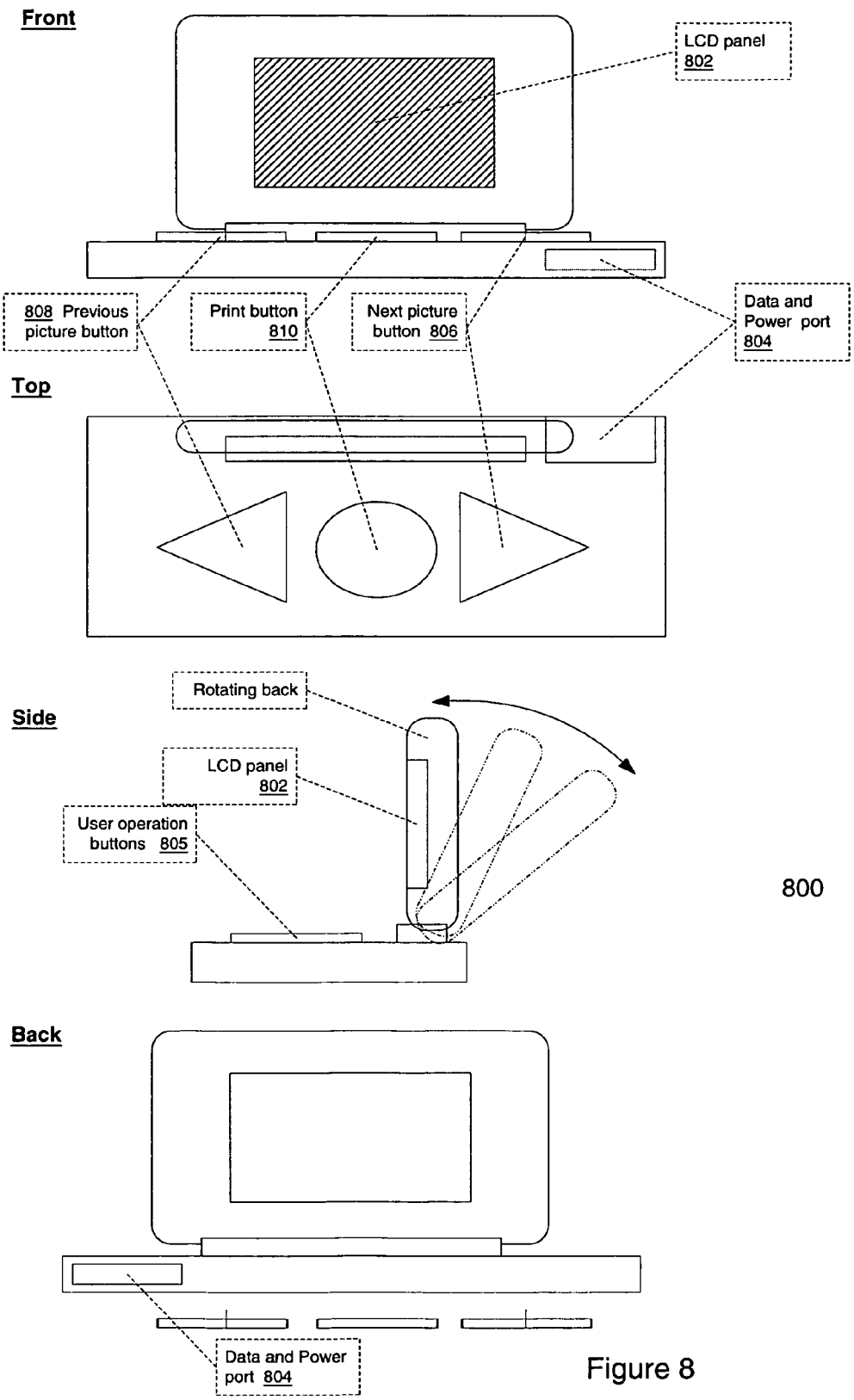
FIG. 8 illustrates a physical layout diagram of an embodiment of a view station.

FIG. 8 illustrates a physical layout diagram of an embodiment of a view station. In an embodiment, the view station 800 may contain a color LCD display 802, a data and power port 804 for external processing unit connection (not shown), a buzzer (not shown), and several user operation buttons 805 such as a Next picture button 806, a Previous picture button 808, a print picture button 810, or other similar buttons.

Figure 9:
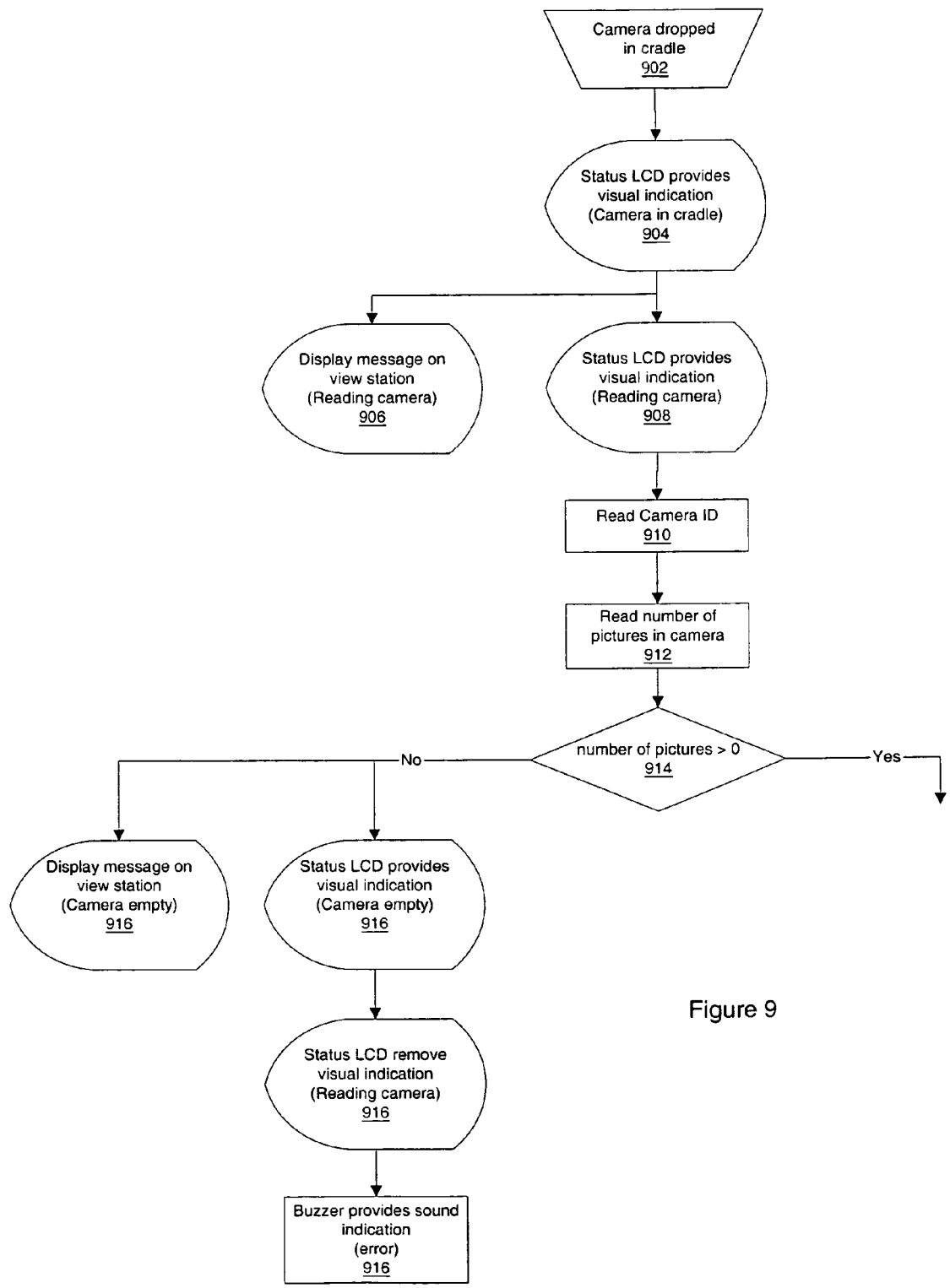
FIG. 9, FIG. 10 and FIG. 11 illustrate an embodiment of a work flow diagram for the external processing unit.
Figure 10:
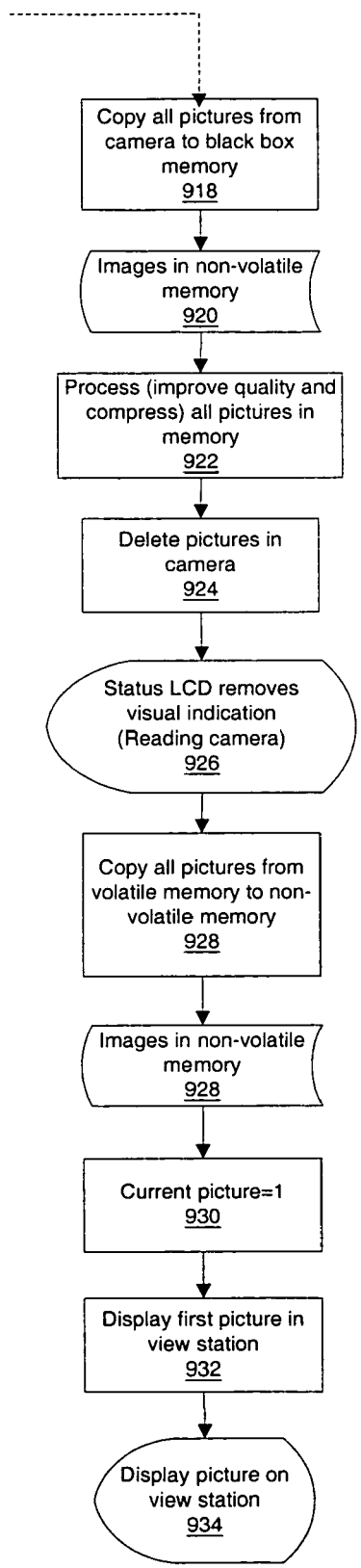
Figure 11:
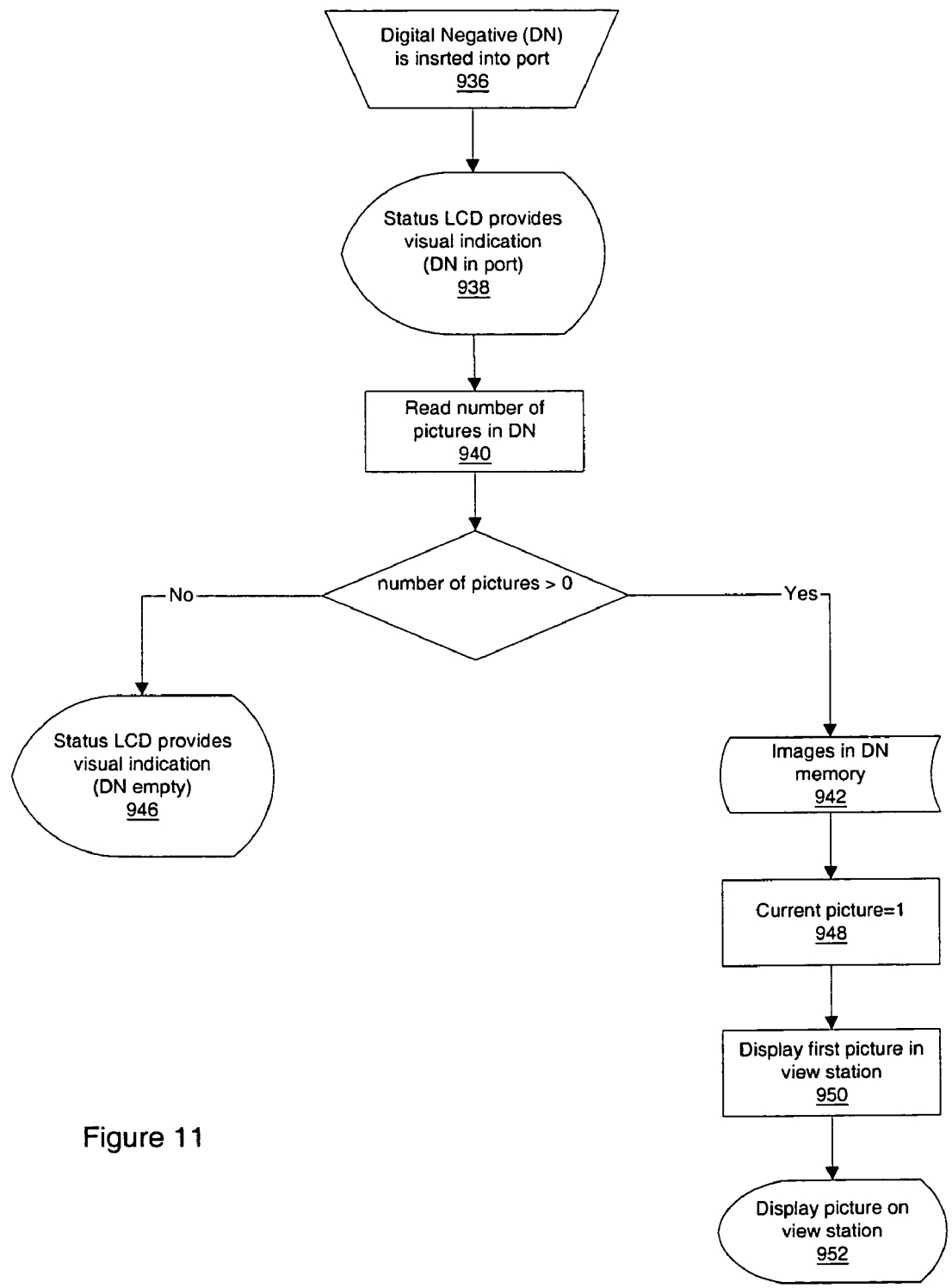

FIG. 9, FIG. 10 and FIG. 11 illustrate an embodiment of a work flow diagram for the external processing unit.

In block 902, a consumer or a retail clerk places the digital OTUC in the cradle.

In block 904, the status display provides visual indication that the digital OTUC is in the cradle.

In block 906, the display displays a message on the view station that the external processing unit's reading the digital OTUC.

In block 908, the status display provides visual indication that the external processing unit is reading the camera.

In block 910, the external processing unit reads the digital OTUC's unique identifier. The image data and unique identifier are communicated through the communication port in the digital OTUC.

In block 912 the external processing unit reads the number of pictures in the camera.

In block 914, the external processing unit determines if the digital OTUC is storing at least one or more pictures.

In block 916, if the external processing unit determines that the digital OTUC is not storing at least one picture then the display displays a message on the view station that the camera is empty. Further, the status display provides visual indication that the camera is empty. If the camera is not empty the external processing unit removes the visual indication from the status display that the camera is being read. The buzzer also provides sound indication that an error condition exists.

In block 918, if the external processing unit determines that the digital OTUC is storing at least one or more pictures, then the micro controller copies all of the pictures from the camera to the memory in the external processing unit.

In block 920, the image data is stored in non-volatile memory.

In block 922, the micro processor executes application software to process and improve the quality and compress all pictures in the memory.

In block 924, the micro processor in the external processing unit sends a signal to the digital OTUC to delete pictures stored in the digital OTUC. In an embodiment, the signal may not delete the images from the camera ensuring that intellectual properties will not get lost by mistake. The signal may just mark the files for deletion, but not actually delete them.

In block 926, the status display removes the visual indication of reading the camera.

In block 928, the micro processor copies all pictures from volatile memory to non-volatile memory images in non-volatile memory.

In block 930, the status display indicates current picture=1.

In block 932, the display illustrates the first-picture in the view station.

In block 934, after the next picture button is pressed the display illuminates the next picture on the view station.

In block 936, a digital negative is inserted into the digital negative port. The user may have a memory card storing digital images, the external processing unit may accept a wide variety of digital media and process images stored in that digital media or in a proprietary digital media.

In block 938, the status display provides a visual indication that a digital negative is in the port.

In block 940, the micro processor reads the number of pictures in the digital negative.

In block 942, the external processing unit determines if the digital negative (DN) is storing at least one or more pictures.

In block 946, if the external processing unit determines that the digital negative is not storing at least one picture then the display displays a message on the view station that the digital negative is empty. Further, the status display provides visual indication that the digital negative is empty. The external processing unit removes the visual indication from the status display that the digital negative is being read. The buzzer also provides sound indication that an error condition exists.

In block 948, the status display indicates current picture=1.

In block 950, the display illustrates the first picture in the view station.

In block 952, after the next picture button is pressed the display illuminates the next picture from the digital memory on the view station.

Figure 12:
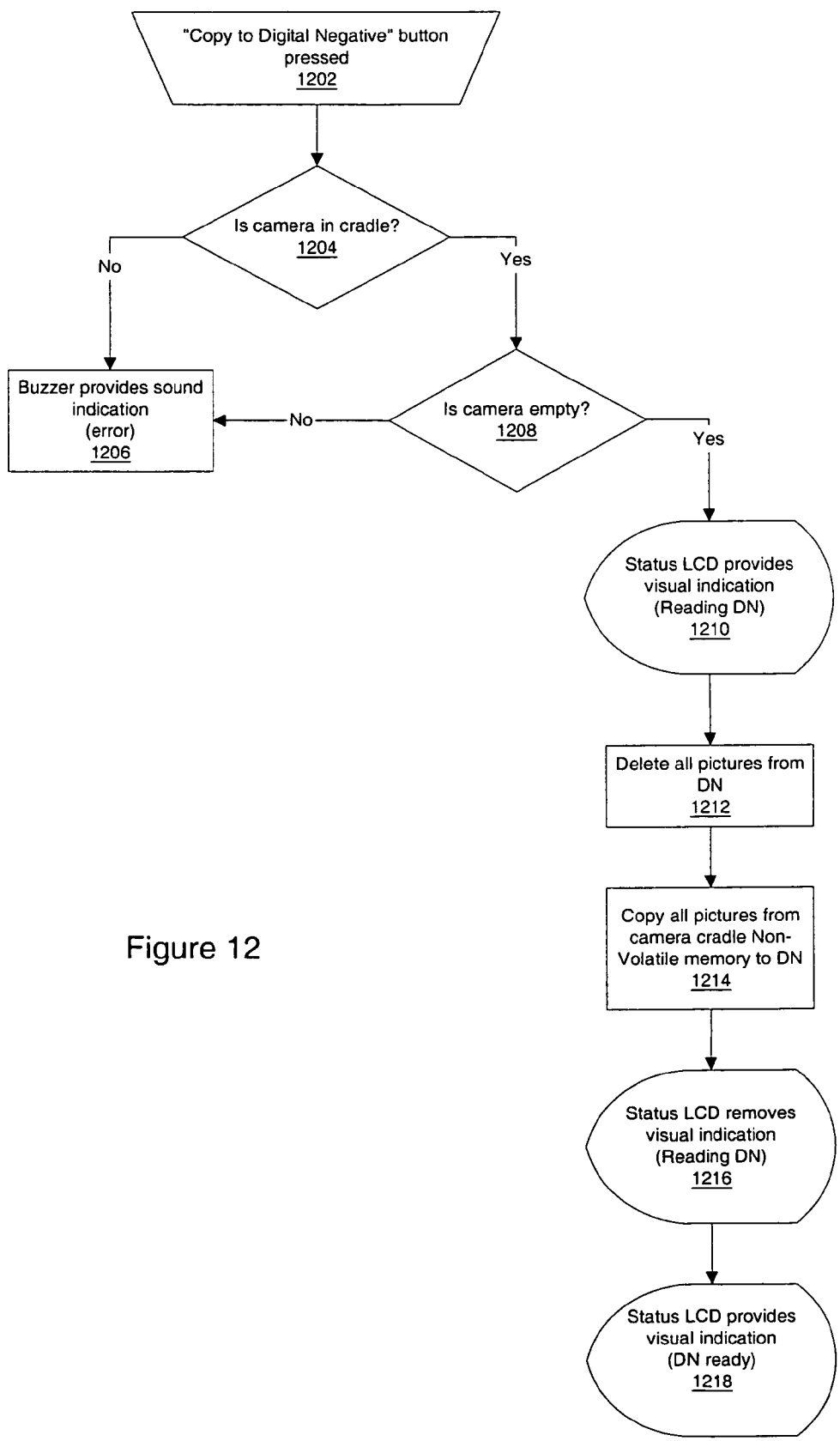
FIG. 12 and FIG. 13 illustrate a work flow diagram of an embodiment of a view station making a digital negative from the digital OTUC.
Figure 13:
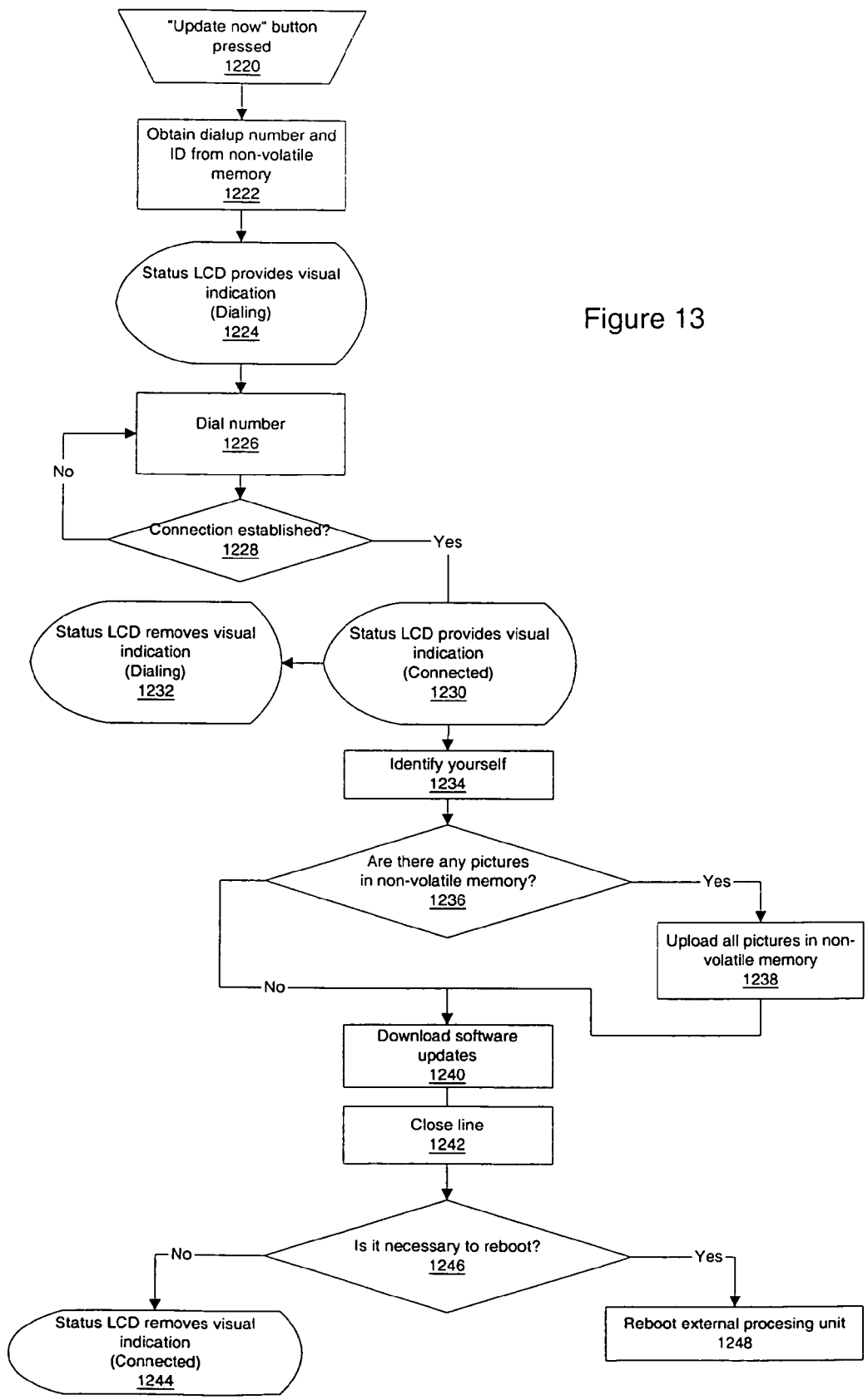

FIG. 12 and FIG. 13 illustrate a work flow diagram of an embodiment of a view station making a digital negative from the digital OTUC.

In block 1202, a user such as consumer or a retail clerk presses the Copy to Digital Negative button.

In block 1204, the processing unit determines whether the digital OTUC is in the cradle.

In block 1206, if the digital OTUC is not in the cradle then the buzzer provides a sound indication that an error condition exists.

In block 1208, if the digital OTUC is in the cradle then the processing unit determines if the Digital OTUC is storing any image files. If no, the processor causes the buzzer to sound because no pictures can be transferred to the digital negative. A digital negative may be a digital media, such as a floppy disk, a CD-ROM, a flash memory card, or any other similar media.

In block 1210, the status display provides visual indication that the external processing unit is reading the digital negative. In an embodiment, the external processing unit reads the digital OTUC's unique identifier.

In block 1212, the external processing unit deletes all the current pictures stored on the digital negative (if there are any).

In block 1214, the micro controller copies all of the image files for the pictures from the digital OTUC or the external CPU memory into non volatile memory contained in the digital negative.

In block 1216, the status display removes the visual indication of reading the digital negative.

In block 1218, the status display provides visual indication that the digital negative is ready.

In block 1220, the update now button is pressed. The external processing unit sends a signal to a remote server to receive maintenance updates, such as firmware and software updates. In an embodiment, the external processing unit performs the remote connection after step 1228.

In block 1222, the processing unit in the external processing unit references a dial up number and identifier from the non-volatile memory.

In block 1224, the status display provides visual indication that the external processing unit is dialing the number.

In block 1226, the number is dialed.

In block 1228, the processing unit checks to ensure a connection has been established. If no connection has been established, then the number is dialed again. This process occurs for several cycles before an error indication signal is sent to the status display and buzzer.

In block 1230, the status display provides visual indication that the connection is established.

In block 1232, the status display removes the visual indication that the system is dialing.

In block 1234, the external processing unit identifies itself with a unique identifier, such as an address.

In block 1236, the external processing unit receives a signal to check if any image files are stored in the non-volatile memory.

In block 1238, if image files are stored in the non-volatile memory, then the external processing unit uploads the image files to an off-site server. The consumer may then view the images on-line, e-mail then to a friend etc. Further, the images may be temporary stored external to the external processing unit whilst software or firmware updates occur within the external processing unit.

In block 1240, the software or firmware updates are downloaded and occur within the external processing unit.

In block 1242, the connection between the remote server and the external processing unit is closed.

In block 1244, the status display removes the visual indication that the connection exists.

In block 1246, the external processing unit determines if a reboot is necessary, such as to properly install the updates.

In block 1248, the external processing unit reboots if necessary.

Figure 14:
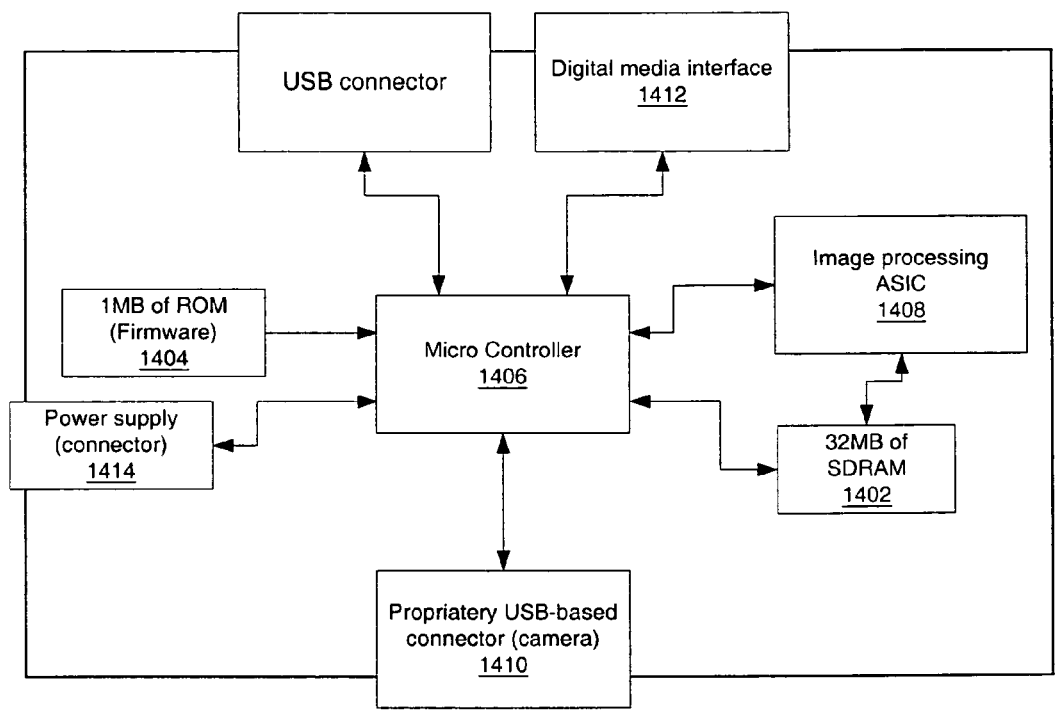
FIG. 14 illustrates an embodiment of a digital OTUC adapter architecture block diagram.

FIG. 14 illustrates an embodiment of a digital OTUC adapter architecture block diagram. The digital OTUC adapter 1400 may contain volatile memory 1402 such as 32 MB of Synchronous DRAM, non-volatile memory 1404 such as 1 MB of ROM for firmware, Micro-controller for firmware execution 1406, Image processing ASIC 1408, Proprietary camera interface 1410 (similar to a USB connection), Standard ports for peripherals and maintenance, one or more Digital media interfaces 1412 (PCMCIA, Smart Media, CompactFlash, etc.), and a Power supply connector 1414.

The digital OTUC adapter 1400 may be used to easily connect the digital OTUC to other devices. The other devices may read pictures contained in the digital OTUC through the adapter 1400. The adapter 1400 uses the proprietary digital OTUC connector 1410 to interface with the digital OTUC on one end and emulates a digital storage media card on the other (SmartMedia, CompactFlash, PCMCIA, Sony Memory Stick etc.). The adapter 1400 also enables a PC to connect to the digital OTUC (using a standard communication interface such as USB connector).

In an embodiment, the adapter 1400 is not supposed to be sold to the consumer as a complementary product but rather to be available for use with 3rd party devices like the Kodak Picture Maker or the FUJIFILM Aladdin or other photo/printing kiosks.

The adapter 1400 reads the picture data from the digital OTUC and may process the pictures in the same way as the external processing unit would. In an embodiment, the main difference may be that the adapter 1400 is small, portable and does not support the range of devices that the external processing unit does.

Figure 15:
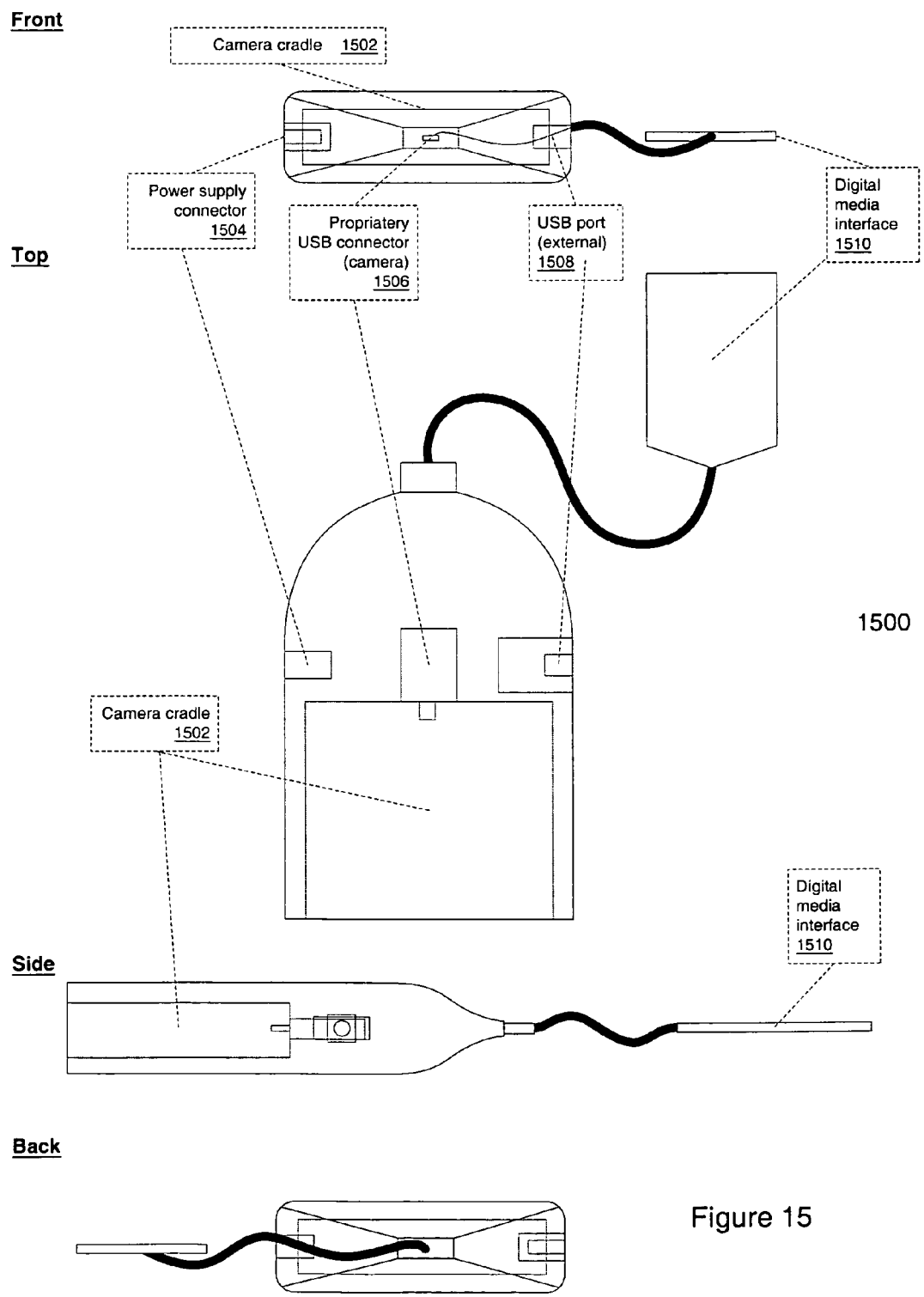
FIG. 15 illustrates an embodiment of a physical diagram of the digital OTUC adapter.

FIG. 15 illustrates an embodiment of a physical diagram of the digital OTUC adapter. The digital OTUC adapter 1500 may contain a Camera cradle 1502, Power supply connector 1504, Proprietary connector 1506 to the digital OTUC, communication port 1508 (such as USB), and a Digital media interface 1510.

Figure 16:
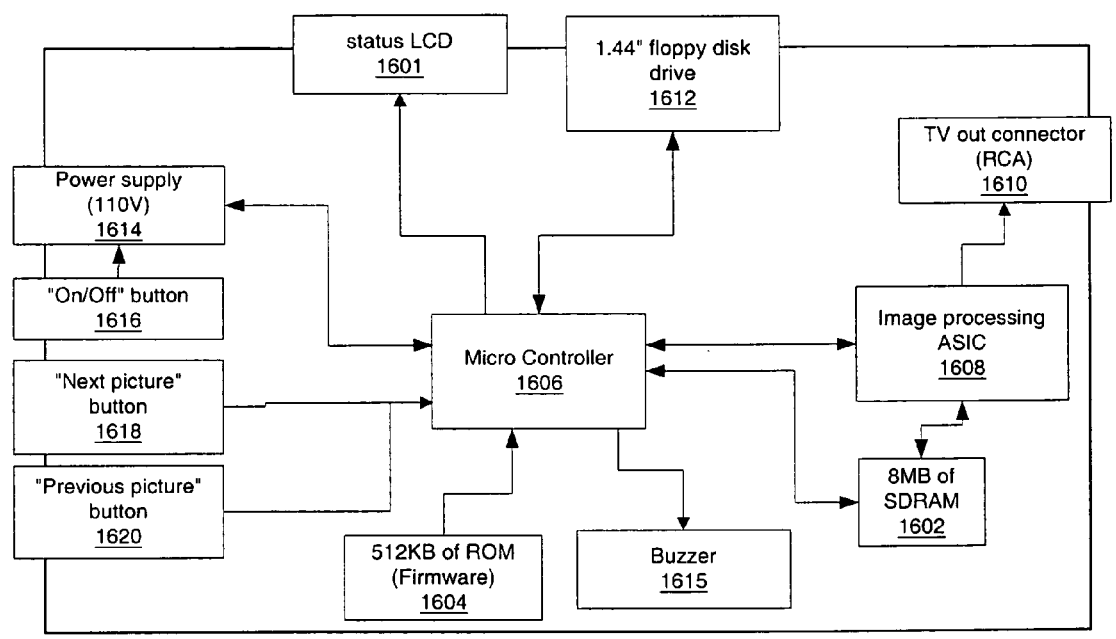
FIG. 16 illustrates in an embodiment of a digital negative TV viewer block diagram.

FIG. 16 illustrates in an embodiment of a digital negative TV viewer block diagram. The digital negative TV viewer 1600 may contain, Multi-segment status LCD 1601 (monochrome), 8 MB of Synchronous DRAM 1602, 512K of ROM for firmware 1604, Micro-controller 1606 for firmware execution, Image processing ASIC 1608, TV connector 1610 (RCA, TV antenna or similar), digital negative reader 1612 such as 1.44" floppy disk drive or removable memory, Power supply 1614 (such as 110 volts), Buzzer 1615, "On/Off" button 1616, "Next picture" button 1618, and "Previous picture" button 1620, all in a Plastic casing.

The digital negative TV viewer 1600 may be a peripheral device to the digital OTUC, designed to enhance and improve the experience that comes with digital photography.

After the consumer takes the digital OTUC for viewing and printing (return the digital OTUC to the retail store) he/she has the option of copying the pictures on to a digital storage media 1612 (1.44" floppy disk or a Flash memory card) called Digital Negative. This Digital Negative should allow the consumer to archive his/her intellectual property for future use or safekeeping.

The viewer allows the consumer to use his/her Digital Negative at home and view its content (pictures) with any TV set that can accept an input from an RCA (or other connector) cable (like VCR or Cam-Corder).

Figure 17:
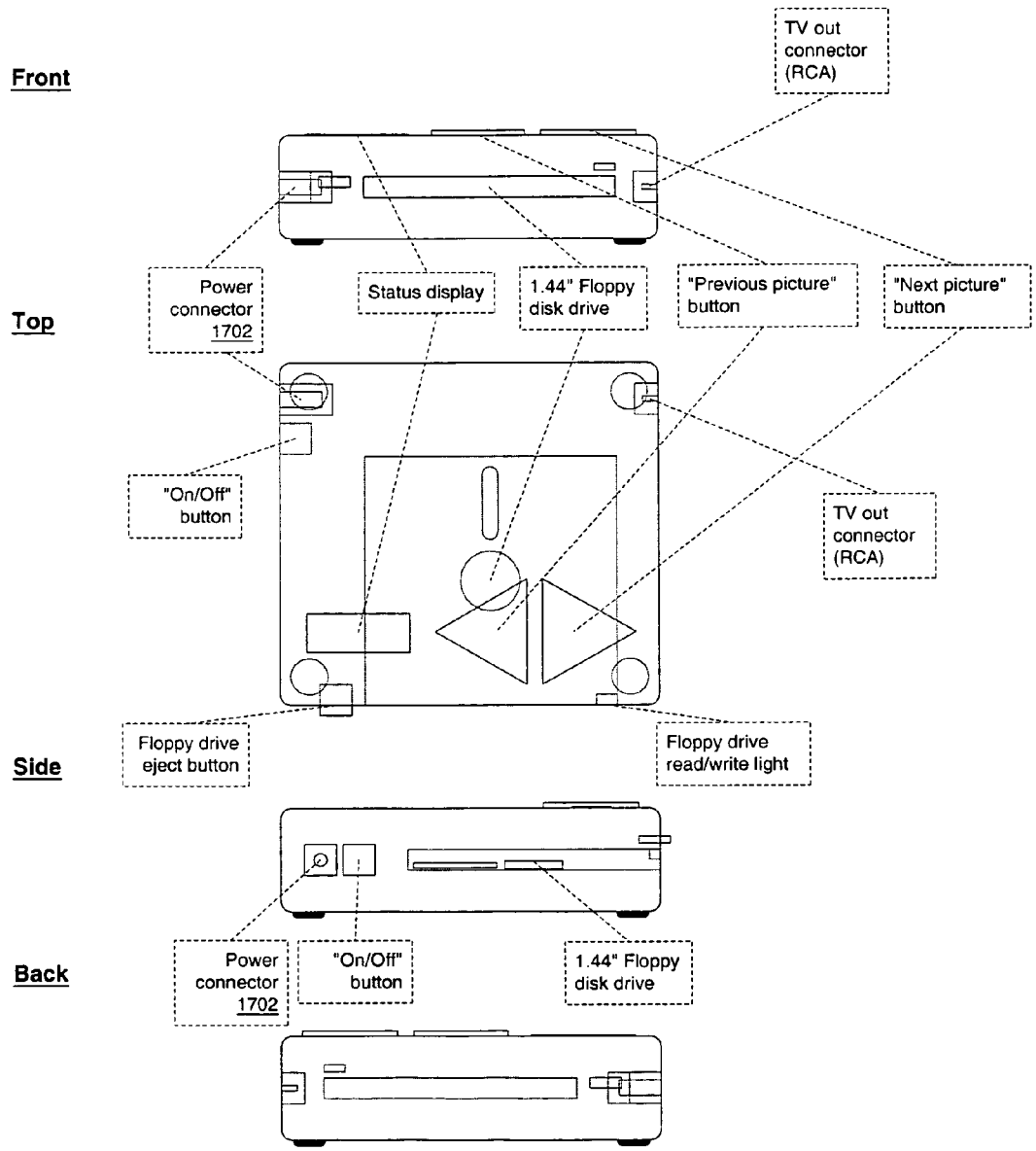
FIG. 17 illustrates a digital TV viewer physical diagram.

FIG. 17 illustrates a digital TV viewer physical diagram. The digital TV viewer 1700 may contain a Camera cradle, Power supply connector 1702, Proprietary USB connector (camera), USB port (external), and one or more Digital media interface. In an embodiment, the TV viewer connects the digital negative to be displayed ion a TV screen. The TV viewer can read data from a digital negative (such as a floppy disk or CD-ROM, and transmit images displayable in a TV format.

In an embodiment, various techniques and algorithms may be employed to improve image quality. In an embodiment, low-res image quality improvement techniques may be used. The low-res image lacks smoothing due to low resolution. The image needs to be enlarged (interpolated) about 400% and only than printed scaled down. The scaled image may be blurry as no new image information was provided but this technique improves the quality of the final (scaled down) image due to the fact that the smoothing elements (pixels surrounding the original pixels) are smaller than the size of the original pixels resulting in a smoother image.

In an embodiment, multiple shots may be employed. The low-res image may enable multiple rapid consecutive shots to occur. This technique requires modification to the way pictures are being taken. In order to make this technique affective the digital OTUC needs to take a minimum number of very rapid (few millisecond delay between shots) consecutive shots, such as four, of the same picture. The consecutive shots are overlaid one on top of the other to create a new picture in the following manner: One picture serves as the base. Each other layer may be added on top of the base with only 100/(n−1) percent transparency (n=number of rapid shots taken). The newly formed picture may be much smoother and more "stable" in terms of its patterns (especially in low lighting conditions where graininess may be apparent).

In an embodiment, non-volatile memory usage improvement techniques may be used. The use of non-volatile memory is good for storing a scaled down version. For example, the 1.3 Mpixel photo contains more information than may be required for a good quality 4"×6" print. It is possible to scale each taken picture down to about 0.6 Mpixel and saving about 53% of the non-volatile memory usage. Also the scaled down image may be of higher quality than an original photo taken with a 0.6 Mpixel sensor as its pixels were created using twice the information.

In an embodiment, non-standard compression techniques may be used. Due to the "close cycle" nature of the recycling and refurbishing of the digital OTUC it may be possible to use non-standard compression techniques with the digital OTUC. Instead of creating JPG files, newer algorithms can be applied (e.g. wavelet compression) to save space (up to 75% saving compared to JPG) and potentially improve quality.

In an embodiment, there are also techniques for reducing the amount of required volatile memory. One such technique is to write directly to the non-volatile memory. Many digital cameras have some volatile memory buffer that is used for high-speed processing and enabling "rapid fire" (reducing delay between shots). The complete image may then be copied to the non-volatile memory. It may be possible to discard the volatile memory completely and do the entire image processing directly on the non-volatile memory—saving cost of volatile memory but loosing processing speed and increasing delay between shots.

In an embodiment, there may also be techniques for using "imperfect" optical sensors. In an embodiment, sensors with black and white pixels may be used. In the manufacturing process of optical sensors there is a certain estimated percentage of sensors that do not pass the strict acceptance criteria set by the camera manufacturers. These imperfect sensors are very often exhibiting what is known as black and white pixels. These imperfect sensors have a certain percentage of pixels that are not light sensitive and instead are constantly black (no light on all color channels) or white (maximum light on all color channels). It is possible to detect these randomly defected pixels and estimate closely their true color. Scanning through the entire image array and looking for pixels that are fully black or white may do this process as well as any other appropriate algorithm. Every black or white pixel may be checked to see that there is no other totally black or white pixel adjacent to it in all eight directions. If it is a single defective pixel than calculating the average color of the eight pixels around it and make that the new color for the defective pixel.

Figure 18:
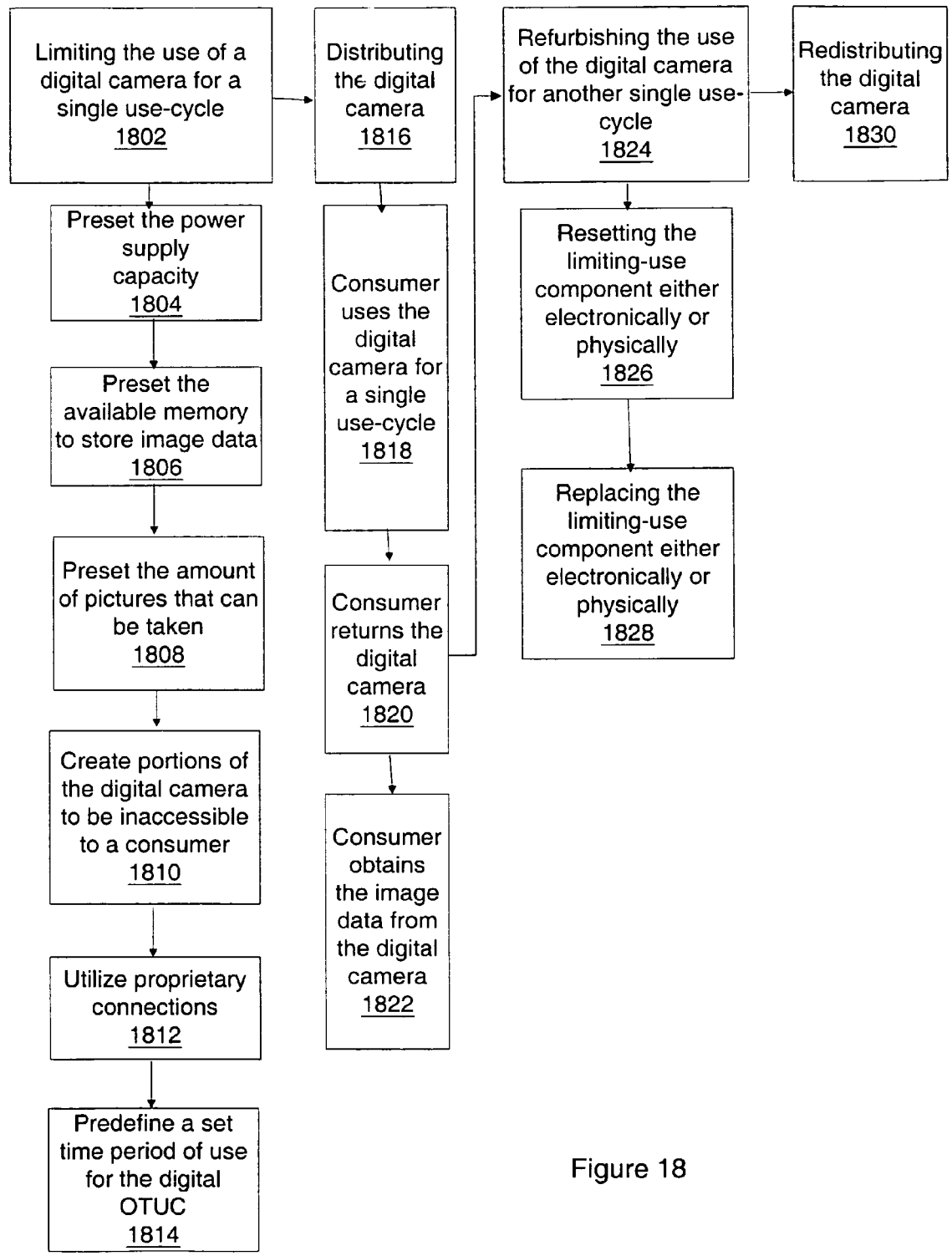
FIG. 18 illustrates a life cycle of an embodiment of a digital one-time use camera.

FIG. 18 illustrates a life cycle of an embodiment of a digital one-time use camera.

In block 1802, the use of a digital OTUC is limited for a single use-cycle. In an embodiment, the digital OTUC has a limiting-use component to limit use of the digital OTUC to a single use-cycle. The limiting-use component may vary and a few examples will be given.

In block 1804, the limiting-use component may be a power supply, such as batteries, designed to allow operation of the digital OTUC for a predetermined period. After the predetermined period, the batteries would be depleted and need to be recharged or replaced during refurbishment of the digital OTUC.

In block 1806, the limiting-use component may be a memory, volatile or non-volatile, with a given capacity to store data corresponding to that capacity.

In block 1808, the limiting-use component may be a preset of the amount of pictures that can be taken. The available memory may be capable of storing more image files, however, a software program limits to the preset capacity of the memory. In an embodiment, a unique identifier from that particular digital OTUC may also be imprinted on each image file stored in the digital OTUC. The unique identifier may be employed to track how many pictures have been taken by a particular digital OTUC and what was done with them. Thus, a customer may be able to purchase a set number of reset tokens to allow the consumer to take more pictures with the same digital OTUC prior to having to return the actual digital OTUC.

In block 1810, the limiting-use component may be an inaccessible portion of the digital camera. In an embodiment, an external casing exists to prevent a consumer from having access to the power supply, memory, reset actuators, or similar components.

In block 1812, the limiting-use component may be proprietary connections utilized to ensure that a consumer or non-authorized retailer could access the data stored within the digital OTUC.

In block 1814, the limiting-use component may be an internal clock to predefine a set time period of use for the digital OTUC.

In block 1816, after the digital OTUC is manufactured and operational, then the digital camera is distributed to retailers, wholesalers, theme parks, consumers, and other avenues of distribution.

In block 1818, the consumer uses the digital camera for a single use-cycle. In an embodiment, the design of the limiting-use component establishes the duration of the single use-cycle. For example, X number of pictures, X period of time, X amount of memory space for storing image data files, etc.

In block 1820, the Consumer takes pictures and returns the digital camera to the retailer, mail-in facility, or Internet facility.

In block 1822, the Consumer obtains the image data from the digital camera at the place where the consumer returned the digital OTUC. The consumer may receive actual photographs, a digital negative of their image files, or a access the image files online.

In block 1824, the use of the digital camera is refurbished for another single use-cycle. In an embodiment, the refurbishment includes a full quality assurance test and replacing the external shell if the embodiment includes a double shell implementation.

In block 1826, in an embodiment, the limiting-use component is reset either electronically or physically in order to refurbish the digital OTUC.

In block 1828, in an embodiment, the limiting-use component is replaced either electronically or physically in order to refurbish the digital OTUC.

In block 1830, after refurbishment, the same digital camera is sent out for distribution again. In an embodiment, the refurbishing facility may be on location and the distribution is internal to that location. For example, in a theme park or a very large retail wholesale facility the recycling may be on site.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. An apparatus, comprising:
   a digital camera having a limiting-use component to limit use of the digital camera to a single use-cycle, one or more sensors to capture data associated with one or more images, and a communication port;
   a memory within the digital camera to store raw image sensor data, wherein the communication port to transfer the raw image sensor data to an external processing unit that performs image-processing operations on the raw image sensor data to convert the raw image sensor data into a graphics file of a captured image.

2. The apparatus of claim 1, further comprising:
   a reset mechanism to refurbish the use of the digital camera for another use-cycle.

3. The apparatus of claim 2, further comprising:
   a proprietary communication port on the digital camera.

4. The apparatus of claim 3, wherein the reset mechanism comprises an actuator accessed through the proprietary communication port.

5. The apparatus of claim 2, wherein the reset mechanism comprises a software program resident in the digital camera that receives a reset signal through the proprietary communication port.

6. The apparatus of claim 1, wherein the limiting-use component comprises a power supply with a non-extendable capacity to operate the digital camera for a preset amount of time.

7. The apparatus of claim 1, wherein the limiting-use component comprises a memory having a preset capacity to store data corresponding to a preset amount of pictures.

8. The apparatus of claim 7, wherein a software program limits the preset capacity of the memory to a preset amount of pictures to be taken.

9. The apparatus of claim 1, wherein the limiting-use component comprises an inaccessible portion of the digital camera covered by an external casing.

10. The apparatus of claim 9, wherein a reset mechanism is located within the inaccessible portion of the digital camera covered by the external casing.

11. The apparatus of claim 9, wherein a power supply is located within the inaccessible portion of the digital camera covered by the external casing.

12. The apparatus of claim 9, wherein a memory to store image data is located within the inaccessible portion of the digital camera covered by the external casing.

13. The apparatus of claim 1, wherein the limiting-use component comprises a unique identifier associated with each individual digital camera.

14. The apparatus of claim 1, wherein the limiting-use component comprises a clock actuated to allow operation of the digital camera to occur for a preset time period per use-cycle.

15. The apparatus of claim 1, wherein refurbishing comprises resetting a component contained in the digital camera to facilitate another use-cycle of the digital camera.

16. The apparatus of claim 1, wherein refurbishing comprises replacing a component contained in the digital camera to facilitate another use-cycle of the digital camera.

17. The apparatus of claim 1, further comprising:
   a first casing and a second casing associated with the digital camera, the second casing being exterior to the first casing, the second casing having a tamper-prevention mechanism.

18. A method, comprising:
   limiting the employ of a digital camera for a single use-cycle;
   configuring the digital camera to transfer raw image sensor data to an external processing unit that performs image processing operations on the raw image sensor data to convert the raw image sensor data into a graphics file of a captured image; and
   refurbishing the digital camera for another use-cycle.

19. The method of claim 18, further comprising:
   covering portions of the digital camera with an external casing, the covered portions being inaccessible to a consumer.

20. The method of claim 18, wherein refurbishing comprises making the digital camera functional for another use-cycle.

21. The method of claim 18, wherein refurbishing comprises resetting a component contained in the digital camera to facilitate another use-cycle of the digital camera.

22. The method of claim 18, further comprising:
   limiting a power supply of the digital camera to a non-extendable capacity in order to operate the digital camera for a preset amount of use.

23. The method of claim 18, further comprising:
   selling the same digital camera two or more times.

24. The method of claim 23, wherein a manufacturer sells the digital camera to a retailer.

25. An apparatus, comprising:
   means for limiting the employ of a digital camera for a single use-cycle;
   means for configuring the digital camera to transfer raw image sensor data to an external processing unit that performs image processing operations on the raw image sensor data to convert the raw image sensor data into a graphics file of a captured image; and
   means for refurbishing the digital camera for another use-cycle.

26. The apparatus of claim 25, further comprising:
   means for covering portions of the digital camera with an external casing, the covered portions being inaccessible to a consumer.

27. The apparatus of claim 25, further comprising;
   means for communicating image data stored in the digital camera to a processing unit external to the digital camera through a proprietary connection.

28. The apparatus of claim 25, further comprising:
   means for limiting a power supply of the digital camera to a non-extendable capacity to operate the digital camera for a preset amount of time.

29. The apparatus of claim 25, further comprising:
   means for selling the same digital camera two or more times.

30. The apparatus of claim 29, wherein a manufacturer sells the digital camera to a retailer.

31. The apparatus of claim 25, wherein refurbishing comprises making the digital camera functional for another use-cycle.

32. The apparatus of claim 25, wherein refurbishing comprises resetting a component contained in the digital camera to facilitate another use-cycle of the digital camera.

* * * * *

UNITED STATES PATENT AND TRADEMARK OFFICE
CERTIFICATE OF CORRECTION

PATENT NO. : 7,126,629 B1  
APPLICATION NO. : 09/949421  
DATED : October 24, 2006  
INVENTOR(S) : Braunstein et al.

Page 1 of 1

It is certified that error appears in the above-identified patent and that said Letters Patent is hereby corrected as shown below:

On the cover sheet, item (73), please replace "Pure Digital Technologies, Icn." with -- Pure Digital Technologies, Inc. --.

Signed and Sealed this

Twenty-seventh Day of October, 2009

David J. Kappos  
*Director of the United States Patent and Trademark Office*